United States Patent
Ricard et al.

(10) Patent No.: US 11,204,908 B2
(45) Date of Patent: Dec. 21, 2021

(54) AUGMENTATION PLAYBACK

(71) Applicant: SAP SE, Walldorf (DE)

(72) Inventors: Christophe Ricard, L'Hay-les-Roses (FR); Naeem Asghar, London (GB)

(73) Assignee: SAP SE, Walldorf (DE)

( * ) Notice: Subject to any disclaimer, the term of this patent is extended or adjusted under 35 U.S.C. 154(b) by 516 days.

(21) Appl. No.: 16/172,721

(22) Filed: Oct. 26, 2018

(65) Prior Publication Data

US 2020/0133933 A1    Apr. 30, 2020

(51) Int. Cl.
| | |
|---|---|
| *G06F 16/00* | (2019.01) |
| *G06F 16/22* | (2019.01) |
| *G06F 7/08* | (2006.01) |
| *G06F 16/28* | (2019.01) |

(52) U.S. Cl.
CPC ............ *G06F 16/2282* (2019.01); *G06F 7/08* (2013.01); *G06F 16/28* (2019.01)

(58) Field of Classification Search
CPC ............................ G06F 16/2282; G06F 16/28
USPC ........................................................ 707/803
See application file for complete search history.

(56) References Cited

U.S. PATENT DOCUMENTS

| | | | |
|---|---|---|---|
| 2014/0095518 A1* | 4/2014 | Schneider | ................. G06F 7/24 707/754 |
| 2014/0181154 A1* | 6/2014 | Amulu | ................... G06F 16/28 707/803 |
| 2015/0006490 A1* | 1/2015 | Balasubramanian | ........................ G06F 16/2365 707/690 |
| 2015/0154240 A1* | 6/2015 | Vezzosi | ................. G06Q 10/06 707/803 |

* cited by examiner

*Primary Examiner* — Chelcie L Daye
(74) *Attorney, Agent, or Firm* — Buckley, Maschoff & Talwalkar LLC

(57) ABSTRACT

A system and method including receiving a request to perform an operation relying on sets-related tables of a semantic layer universe; injecting in response to the received request, persisted Data Foundation (DF) objects stored in a dedicated data structure of a first set container into the in-memory representation of the semantic layer universe, each of the DF objects being automatically created based on sets-related tables of the semantic layer universe; injecting, by the processor and in response to the received request, persisted business layer (BL) objects stored in a dedicated data structure of the first set container into the in-memory representation of the semantic layer universe, each of the BL objects being automatically created based on the sets-related tables of the semantic layer universe; and executing the operation on the augmented semantic universe, including using the injected DF objects and the injected BL objects.

17 Claims, 43 Drawing Sheets

600

PUBLISH UNIVERSE TO EXPOSE ITS BUSINESS OBJECTS (BOs)
605

CREATE SET CONTAINERS
610

LINK THE UNIVERSE AND ONE OR MORE OF THE SET CONTAINERS TO EACH OTHER
615

CREATE SETS ON TOP OF THE UNIVERSE'S BO's
620

```
┌─────────────────────────────────────────────────┐
│ DETERMINE THE SET CONTAINERS LINKED TO THE      │
│ UNIVERSE TO BE QUERIED BASED ON THE REPOSITORY  │
│ RELATIONSHIPS OF THE UNIVERSE                   │
│                                             805 │
└─────────────────────────────────────────────────┘
                        │
                        ▼
┌─────────────────────────────────────────────────┐
│ RETAIN, IN ACCORDANCE WITH A SECURITY POLICY,   │
│ THE ALLOWED SET CONTAINERS                      │
│                                             810 │
└─────────────────────────────────────────────────┘
                        │
                        ▼
┌─────────────────────────────────────────────────┐
│ RETAIN, IN ACCORDANCE WITH THE SECURITY POLICY, │
│ THE ALLOWED BOs                                 │
│                                             815 │
└─────────────────────────────────────────────────┘
                        │
                        ▼
┌─────────────────────────────────────────────────┐
│ RETAIN, IN ACCORDANCE WITH THE SECURITY POLICY, │
│ THE ALLOWED SET(S)                              │
│                                             820 │
└─────────────────────────────────────────────────┘
                        │
                        ▼
┌─────────────────────────────────────────────────┐
│ PRESENT A CONSOLIDATED VIEW OF THE RELEVANT BOs │
│ AND ALLOWED SET(S) TO AN END USED VIA A UI      │
│                                             825 │
└─────────────────────────────────────────────────┘
```

*FIG. 8*

```
public class TableDesc {
    String name;
    List<Column> columns;
    PrimaryKey primaryKey;
    PrimaryKey virtualPKey;
    ...
}
```

1300

```
private static Table insertSetTable(BusinessSegmentation segmentation,
                                    Universe universe,
                                    TableDesc tableDesc,
                                    Table originalTable,
                                    String subjectName,
                                    IConnectionSolver solver) {
    DataFoundation dataFoundation = ((SQLBindingSet)universe.getBindingSets().get(0)).getDa if(originalTable == null) {
        SQLTable sqlTable = DataFoundationFactory.eINSTANCE.createSQLTable();

1305    sqlTable.setBusinessName(tableDesc.getName());
        sqlTable.setType(SETS_AUTOGENERATED_TABLE_TYPE);
        sqlTable.setQualifier(segmentation.getMl3nQualifier()== null ? "" : segmentation.get
        sqlTable.setOwner(segmentation.getMl3nOwner()== null ? "" : segmentation.getMl3nOwne
        sqlTable.setDataSource(dataFoundation.getDataSource());

createColumns(sqlTable, tableDesc);

DelimitationHelper.delimitTable(sqlTable, dataFoundation, solver);

return sqlTable;

private static void createColumns(SQLTable table, TableDesc tableDesc) {
    List<Column> pKeyColumns = new ArrayList<Column>();

for (com.businessobjects.sets.services.table.Column setCol : tableDesc.getColumns()){
        Column column = DataFoundationFactory.eINSTANCE.createColumn();
        column.setBusinessName(setCol.getName());
        column.setDataType(MTSQLHelper.convertDataTypeToSQLDataType(setCol.getType()));
        column.setDecimalDigits(10);
        column.setDisplaySize(10);
        column.setNullable(setCol.isNull());
        //column.setUnsigned(fieldInfo.Unsigned());
        table.getColumns().add(column);

PrimaryKey key = null;
        if (tableDesc.getPrimaryKey() != null){
            key = tableDesc.getPrimaryKey();
        }else if (tableDesc.getVirtualPKey()!=null) {
            key = tableDesc.getVirtualPKey();
        }
```

FIG. 13

```
TableView tvMaster = ViewFactory.eINSTANCE.createTableView();
tvMaster.setTable(table);
tagTableView(tvMaster, DataFoundationHelper.MASTERVIEW_TAG);
if (table.getDataFoundation() == null)
    dfxView.getDataFoundation().getDataFoundationViews().get(0).getTableViews().add(tvMaster);
```

1500

1505

1510

```
aliasTable aliasTable = DataFoundationFactory.eINSTANCE.createAliasTable();
String pattern = "Alias of {0} ({1})";
aliasTable.setBusinessName(NLS.bind(pattern, originalTable.getBusinessName(), subjectName));
aliasTable.setAliasedTable((originalTable instanceof SQLTable ? originalTable : ((AliasTable)origin
AliasHelper.registerAliasTable(aliasTable);
aliasTable.setDataSource(dataFoundation.getDataSource());
dataFoundation.getTables().add(aliasTable);

return aliasTable;
```

FIG. 18

```
SELECT setinfo."set_identifier",
per.period_id,
per.period_sequence,
cal.calendar_name,
cal.calendar_grain,
cal.calendar_id
FROM set_cal1bOQEGJEeid5Iz4jMFQ cal INNER JOIN set_per1bOQEGJEeid5Iz4jMFQ per ON (
cal.calendar_id = per.calendar_id)
INNER JOIN (SELECT set_metadata.set_identifier,
set_metadata.calendar_id FROM set_metadata) setinfo ON (setinfo.calendar_id = per.calendar_id)
```

```
set_contact_membership.set_uuid = "Period Info MANUAL".SET_IDENTIFIER
AND "Period Info".START_DATE BETWEEN set_contact_membership.sdate AND
set_contact_membership.edate private static SQLJoin addJoinWithExpression(Universe universe,
        IConnectionSolver solver,
        String expression) {

DataFoundation  dataFoundation = ((SQLBindingSet)universe.getBindingSets().get(0)).getDataFo
    SQLJoin newJoin = null;

try {
        newJoin = DataFoundationFactory.eINSTANCE.createSQLJoin();
        JoinHelper.setJoinExpression(dataFoundation, newJoin, expression, solver);
        dataFoundation.getJoins().add(newJoin);
    }
    catch(Exception ex) {
        System.out.println(ex.getMessage());//FIXME: jub!!!
    } return newJoin;
}
```

FIG. 22

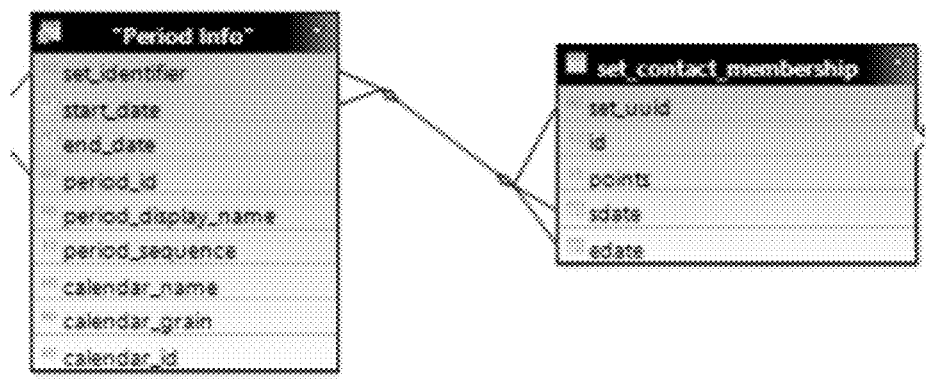

```
CREATE AT LEAST ONE DATA FOUNDATION TABLE, EACH
OF THE AT LEAST ONE DATA FOUNDATION TABLES BEING
CREATED FOR EACH OF ONE OR MORE SET TABLES IN A
DATABASE BASED ON INFORMATION STORED IN A FIRST SET
CONTAINER RELYING ON THE ONE OR MORE SET TABLES
                                                2405
```

```
LINK THE AT LEAST ONE OF THE CREATED DATA
FOUNDATION TABLES TO A CUSTOMER TABLE IN THE
DATABASE, THE CREATED DATA FOUNDATION TABLE BEING
LINKED TO THE CUSTOMER TABLE BASED ON A PRIMARY
KEY FOR THE CUSTOMER TABLE
                                                2410
```

```
STORE ALL OF THE CREATED DATA FOUNDATION
TABLES IN A DEDICATED DATA STRUCTURE HOSTED
BY THE FIRST SET CONTAINER
                                                2415
```

*FIG. 24*

```
private static Folder createFolder(String folderName, Folder rootFolder){

Folder folder = null;

folder = BusinessFactory.eINSTANCE.createFolder();
    folder.setBusinessName(folderName);
    rootFolder.getBusinessItems().add(folder);

return folder;
}
```

2900

- Contact Id
  - Count of Contact Id
  - Id
  - Points
  - Name
  - Current Records
  - Period Display Name
  - Membership Status
  - First Period
  - Last Period
  - Present Members
  - Absences
  - Migration
    - Origin Set
    - Period From
    - Exclude Leavers

*FIG. 29*

```
businessObject = BusinessFactory.eINSTANCE.createDimension();

String name;

name = NamingHelper.getDisplayableName(objectName, true);
businessObject.setBusinessName(name);
businessObject.setDataType(dataType); //DataFoundationHelper.getDataType(sx SQLBinding binding = BindingFactory.eINSTANCE.createSQLBinding();
binding.setBindingSet(universe.getBindingSets().get(0));

BindingHelper.updateSelect(universe, binding, selectExpression, solver);
BindingHelper.updateWhere(universe, binding, "", solver); //$NON-NLS-1$ binding.getExtraTables().addAll(extraTables);
businessObject.getBindings().add(binding);

return businessObject;
```

- Contact Id
    - Count of Contact Id
    - Id
    - Points
    - Name
        - Counts
        - No Of Refresh
        - Date Refreshed
        - Table Name
    - Current Records
        - Total Records
        - Joiners
        - Leavers

*FIG. 31*

```
private static Measure createMeasure(String measureName, String measureExpression, String where
Measure measure = BusinessFactory.eINSTANCE.createMeasure();
measure.setBusinessName(measureName);
measure.setDataType(dataType);
measure.setAggregationFunction(AggregationFunction.DELEGATED);
measure.setWithListOfValues(false);
measure.setForFilter(false);

SQLBinding binding = BindingFactory.eINSTANCE.createSQLBinding();
binding.setBindingSet(universe.getBindingSets().get(0));
BindingHelper.updateSelect(universe, binding, measureExpression, solver);

if (whereExpression != null)
    BindingHelper.updateWhere(universe, binding, whereExpression, solver); //boolean=if if (extraTable != null)
    binding.getExtraTables().add(extraTable);
binding.getBindings().add(binding);

return measure;
}
```

```
filter.setFilterType(FilterType.BUSINESS);
filter.setQueryDefinition(queryXML); ~3805
filter.setApplyOnListOfValues(false);
```

```
List<EObject> createdDFXObjects = new ArrayList<EObject>();
Folder setsRootFolder = BusinessFactory.eINSTANCE.createFolder();

setsRootFolder.setPropertyBag(EntityFactory.eINSTANCE.createPropertyBag());
setsRootFolder.getPropertyBag().setPropertyValue(SETS_DYNAMIC_FOLDER_PROP, "YES");//<NEW-ML5-1>
setsRootFolder.setBusinessName(generateSetsName(universe));
universe.getRootFolder().getBusinessItems().add(setsRootFolder);

//Add tables, table views and joins to the data foundation, adding them in a dedicated data foundation view
createSubjectAdditions(segmentation, universe, solver, setsRootFolder);

data.dfxData = setsRootFolder;//Store real universe object
data.dfxData.addAll(createdDFXObjects);//Store real data foundation objects
```

FIG. 45

```
private static void sort(List<EObject> l, final Boolean isLeaveIfFirst) {
    Collections.sort(l, new Comparator<EObject>() {
        public int compare(EObject o1, EObject o2) {
            if(o1 == o2)
                return 0;

int rc = getWeight(o2) - getWeight(o1);

return isLeaveIfFirst ? rc : -rc;
        } private int getWeight(EObject o) {
            if(o instanceof Join)
                return 5;

if(o instanceof TableView)
                return 10;

if(o instanceof Family)
                return 11;

if(o instanceof DataFoundationView)
                return 12;

if(o instanceof AliasTable)
                return 15;

if(o instanceof SQLTable)
                return 20;

if(o instanceof DerivedTable)
                return 25;

throw new IllegalStateException("Unexpected class: " + ((o != null) ? o.getClass().getSimpleName() : "null"));
        }
    });
}
```

FIG. 49

```
public static TableViewInfo getType(TableView tv) {
    String description = tv.getDescription();
    TableViewInfo result = new TableViewInfo();

if(description != null) {
        boolean isCustomer = description.contains(CUSTOMER_TAG);

if(description.contains(DataFoundationHelper.MASTERVIEW_TAG)) {
            result.type = isCustomer ? TableViewType.CUSTOMER_IN_MASTER : TableViewType.GENERATED_IN_MASTER;
        }
        else if(description.contains(ORIGINAL_TABLE_TAG)) {
            result.type = TableViewType.CUSTOMER_IN_ORIGINAL;
        }
        else if(description.contains(AUTOGENERATED_VIEW_SUBJECT_NAME)) {
            result.type = isCustomer ? TableViewType.CUSTOMER_IN_DEDICATED : TableViewType.GENERATED_IN_DEDICATED;
        } if(isCustomer) {
            int index = description.indexOf(IDENTIFIER_TAG);

if(index != -1) {
                result.id = description.substring(index + IDENTIFIER_TAG.length());
            }
        }
    }
    return result;
}
```

FIG. 50

```
else if(o instanceof TableView) {
    TableView tv = (TableView)o;
    TableViewInfo tableInfo = getType(tv);

switch(tableInfo.type) {
        case CUSTOMER_IN_DEDICATED:
        case GENERATED_IN_DEDICATED:
            for (DataFoundationView subjectView: subjectViews) {
                if (tv.getDescription().contains(subjectView.getBusinessName()) || SUBVIEW_TAG.contains(tv.getDescription())) {
                    subjectView.getTableViews().add(tv);
                    break;
                }
            }
            break;
        case CUSTOMER_IN_MASTER:
        case GENERATED_IN_MASTER:
            data.getDataFoundationViews().get(0).getTableViews().add(tv);
            break;
        case CUSTOMER_IN_ORIGINAL:
            originalView.getTableViews().add(tv);
            break;
        ...
    }
    ...
}
```

FIG. 51

```
else if(o instanceof TableView) {
    TableView tv = (TableView)o;
    Table originalTable = tv.getTable();
    Table copiedTable = (Table)mapOriginal2Copy.get(originalTable);

tv.setFamily(family);
    if(copiedTable == null && solver != null) {
        boolean alreadyRemapped = remapTaggedCustomerTableView(tv, dafo);

if(! alreadyRemapped)
            tv.setTable(copiedTable);
    }
    else
        tv.setTable(copiedTable);
}
```

FIG. 52

```
//Find out all names which are referencing this specific auto-per'ed table;
Map<EObject, Collection<EObject, Collection<EStructuralFeature.Setting>> usages = {CoreUtil.UsageCrossReferencer.findAll(Arrays.asList(t),
    for(Map.Entry<EObject, Collection<EStructuralFeature.Setting>> entry : usages.entrySet()) {
        for(EStructuralFeature.Setting setting : entry.getValue()) {
            EObject referencingEObject = setting.getEObject();
            if(referencingEObject instanceof SQLJoin)
                createdFKElements.add((SQLJoin)referencingEObject);
```

*FIG. 53*

```
for(EObject entity : addedEntities) {
    if(entity.eContainer() == null || entity.eContainer() instanceof AnalyticsInfo)
        throw new IllegalStateException("Object should be part of Data Foundation");//$NON-NLS-1$ if(entity instanceof Table) {
        ((Table)entity).getDataFoundation().getTables().remove(entity);
        if(entity instanceof AliasTable)
            AliasHelper.unregisterAliasTable((AliasTable)entity);
    }
    else if(entity instanceof Join) {
        ((Join)entity).getDataFoundation().getJoins().remove(entity);
    }
    else if(entity instanceof TableView) {
        ((TableView)entity).getDataFoundationView().getTableViews().remove(entity);
    }
    else if(entity instanceof Family) {
        ((Family)entity).getDataFoundation().getFamilies().remove(entity);
    }
    else if(entity instanceof DataFoundationView) {
        ((DataFoundationView)entity).getDataFoundation().getDataFoundationViews().remove(entity);
    }
}
```

FIG. 54

AUGMENTATION PLAYBACK

BACKGROUND

Enterprise software systems receive, generate, and store data related to many aspects of a business enterprise. This data may relate to sales, customer relationships, marketing, supplier relationships, inventory, human resources, and/or finances. Users may operate querying and reporting tools to access such data and display the data in useful formats, such as graphic visualizations and reports.

In some environments, a semantic layer universe may reside between an enterprise's data (e.g., a database) and the end users (e.g., customers). In some aspects, the semantic layer universe can include representations of the enterprise's data warehouse, including representations of real-world entities and processes. In some cases, the semantic layer universe might provide a mechanism to securely share the enterprise's data through a connection to one or more different querying clients. The semantic layer universe can be a valuable asset of the enterprise that can be used to generate insights into the operations of the enterprise. As such, constant maintenance of the integrity and security of the semantic layer universe may be vital to the enterprise. However, some users may have a desire to dynamically enhance capabilities of the semantic layer universe.

BRIEF DESCRIPTION OF THE DRAWINGS

FIG. 6 is an example embodiment of an illustrative flow diagram of an authoring process;

FIG. 8 is an example embodiment of an illustrative flow diagram of a querying process;

FIG. 13 is an example embodiment of sample code for creating a data foundation table;

FIG. 18 is an example embodiment of sample code for creating alias tables;

FIG. 20 is an example embodiment of SELECT statements related to derived tables;

FIG. 21 is an example embodiment of sample code to create a derived table;

FIG. 22 is an example embodiment of an illustrative statement describing a complex join;

FIG. 23 is an example depiction of a complex join in a data foundation;

FIG. 24 is a flow diagram of a process;

FIG. 29 is an example embodiment of file structure;

FIG. 30 is an example embodiment of sample code for creating dimensions for a BO;

FIG. 31 is an example embodiment of file structure;

FIG. 32 is an example embodiment of sample code for creating measures for a BO;

FIG. 34 is an example embodiment of sample code for creating filters;

FIG. 35 is an example embodiment of a user interface;

FIG. 38 is an example embodiment of sample code for creating a complex filter;

FIG. 39 is an example embodiment of sample code for creating a business filter;

FIG. 40 is an example embodiment of a sample code for generating a SQL expression;

FIG. 41 is an example embodiment of sample code for a generic expression;

FIG. 45 is an example embodiment of sample code for listing and storing auto-generated BL objects;

FIG. 49 is an example embodiment of sample code for a sorting algorithm herein;

FIG. 50 is an example embodiment of sample code for storing tagging information with a TableView;

FIG. 51 is an example embodiment of sample code for an attaching procedure for a TableView;

FIG. 52 is an example embodiment of sample code for a remapping procedure for a TableView;

FIG. 53 is an example embodiment of sample code for collecting joins;

FIG. 54 is an example embodiment of sample code for removing generated objects;

DETAILED DESCRIPTION

Figure 1:
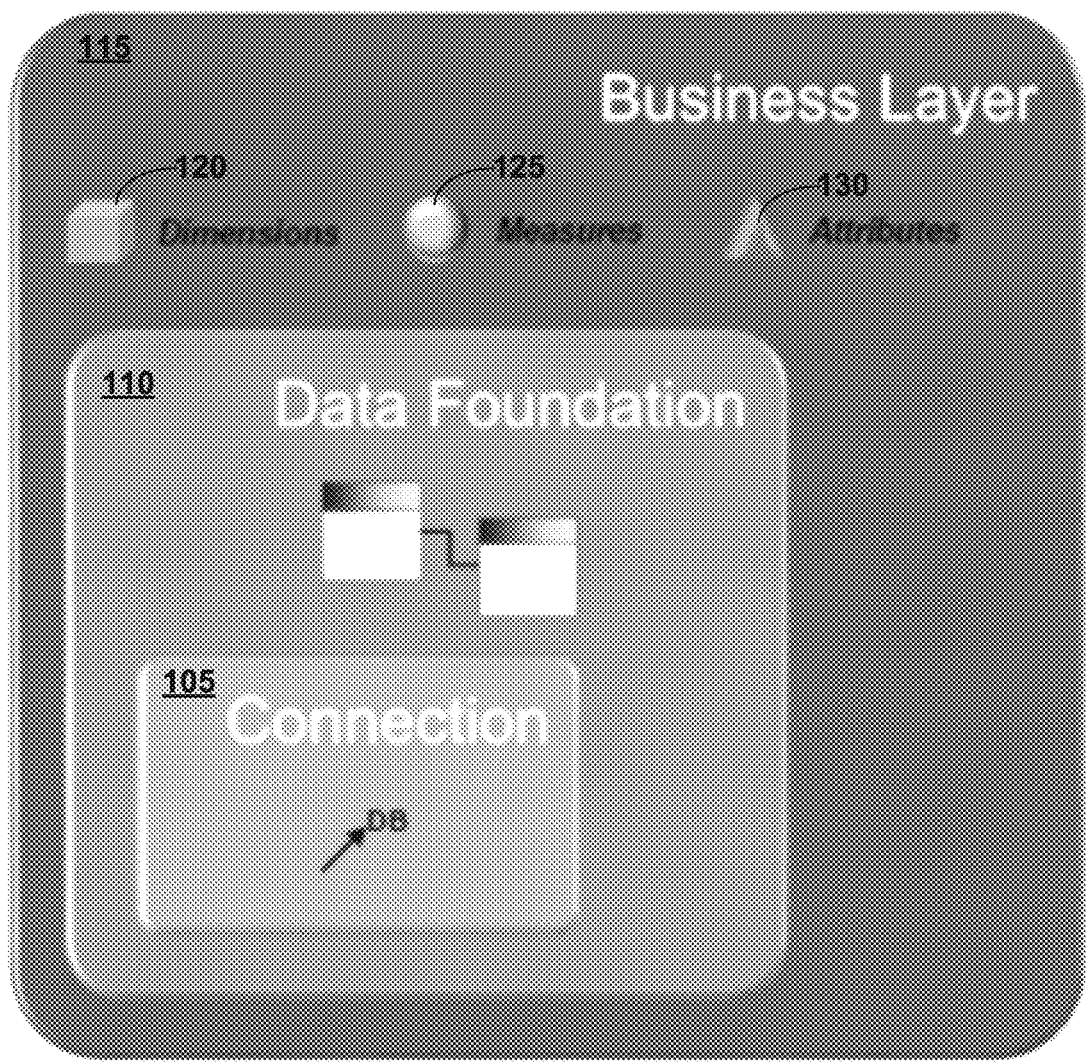
FIG. 1 is an example architecture for semantic layer authoring.

The following description is provided to enable any person in the art to make and use the described embodiments. Various modifications, however, will remain readily apparent to those in the art.

In some example contexts, use-cases, and embodiments, one or more terms will be used in the present disclosure. As a matter of introduction and to ease the understanding of the present disclosure, a number of terms will be introduced, where the full meaning of the following terms will be further understood in context of the disclosure herein, on the whole.

As used herein, a "Business Object" (BO) or simply "object" represents an aspect or feature of a real-world entity (e.g., company, person, product, process, a key performance index (KPI) for an area of an organization or business, etc.) and is mapped to specific data structures (e.g., table columns) in an underlying data source such as a database. A BO is a semantic entity, such as "Year", "Region", "Product", "Customer", etc. that represents a logical way of categorizing and grouping data for meaningful analysis of a business area or activity. A BO data structure can include fields with attributes and metadata associated with and defining the attribute fields. In some aspects, the BO refers to the specific collection of data according to the data structure (i.e., an instance of the BO data structure) that is stored in the database.

A "repository" may refer to a database used to store enterprise (i.e., organizational) platform information, such as user, server, folder, document, configuration, and authentication details.

A Semantic Layer (SL) herein refers to a representation of an organization's data that facilitates end users accessing the data autonomously using common understandable terms. A semantic layer may map complex data to familiar terms such as, for example, "product", "customer", or "revenue" in an effort to offer a unified, consolidated view of data across the organization that users can access without having a need to know the intricacies and complexities of the database, including its schema. The data and metadata (that is, objects) that comprise the semantic layer may be retrieved from a database and form a "semantic layer universe". As used herein, a semantic layer universe (also referred to simply as a "universe" and "UNX") is an abstraction of a data source that maps complex data into descriptive terms used across the organization. Some examples include, "Product," "Customer," "Region," "Revenue," "Margin", and "Costs". The universe resides between an organization's database(s) (or other data sources) and end-users such as customers, and isolates the end users from the technical details of the database(s) where source data is stored. Consistent with other terms herein, semantic universes include objects that are grouped into classes (and subclasses) that are mapped to the source data in the database and may be accessed through queries and reports. A "universe editor" refers to a dedicated User Interface (UI) that provides a mechanism to allow a specific role among users (universe designers) to design universes.

As used herein, a "set" refers to a semantic entity defining one or more steps to follow (i.e., a method) to produce, for example, a list of unique and homogeneous data-mart identifiers (Customer IDs, Product IDs, Transaction IDs, etc.). A set is created on top of BOs, including the data (e.g., fields and attributes) and metadata associated therewith. A set may include other aspects or features, in addition to the one or more BOs on which it is created or based. A "set container" refers to a structure hosting a number of sets, possibly among other entities, for performance and administrative purposes. A "set designer" refers to a role aimed at designing and publishing sets and a "sets editor" refers to a dedicated UI that allows set designers to design Sets.

In some aspects herein, the term "secured universe" is used. A secured universe refers to a transient version of a universe that might be generated for end users' purposes. The secured universe restricts what a given user can see and manipulate according to the credentials the user provides when logging into a system.

A "query" is used to retrieve a collection of BOs (i.e., "objects") based on specific criteria. In some embodiments, an inquiry or query is converted by an application, service, or server (e.g. a BusinessObjects server) to SQL or other language statements appropriate to query the database. The SQL (or other language) query is sent to the database to retrieve the data mapped to the objects referenced and relevant to the query. A collection of criteria that restricts the type and/or number of records returned as a query result is referred to as a "filter". In some aspects, a filter defines a sub-set of data to appear in a query's result list. Some embodiments herein may include a "query panel" (QP). A QP refers to a UI, possibly dedicated, that provides a mechanism to allow end users to define queries. The QP may also present a view of the Universe to the end user.

FIG. 1 is an example of a logical depiction of an architecture overview 100 for the authoring of universes, in some embodiments. In some aspects, universes may be authored in a hierarchical manner (i.e., like "nesting dolls") where successive layers build on top of lower layers. A connection layer 105 provides access to a database (i.e., data source), and may include, credentials, schema, and (optional) connections strings for connecting to the database. A Data Foundation (DF) layer 110 contains one or more tables (e.g., 112, 114) and joins (e.g., 113) from the database (i.e., data source(s)) accessed by the connections specified by connection layer 105. Joins are used to combine tables in DF 110 and define how data is queried in the tables therein. In some aspects, DF 110 may import database tables into an authoring model herein, and further enrich the schema thereof with particular table types, loins, calculated columns, prompts, and other artifacts. A Business Layer (BL) 115 is built on top of DF 110. BL 115 includes metadata objects, such as dimensions 120, measures 125, attributes 130, etc. BL 115 can be used to create business-oriented objects for consumption in, for example, reporting tools. In some aspects, each "layer" in FIG. 1 builds on top of the layer(s) below it, while having no knowledge of the layer(s) above it.

Figure 2:
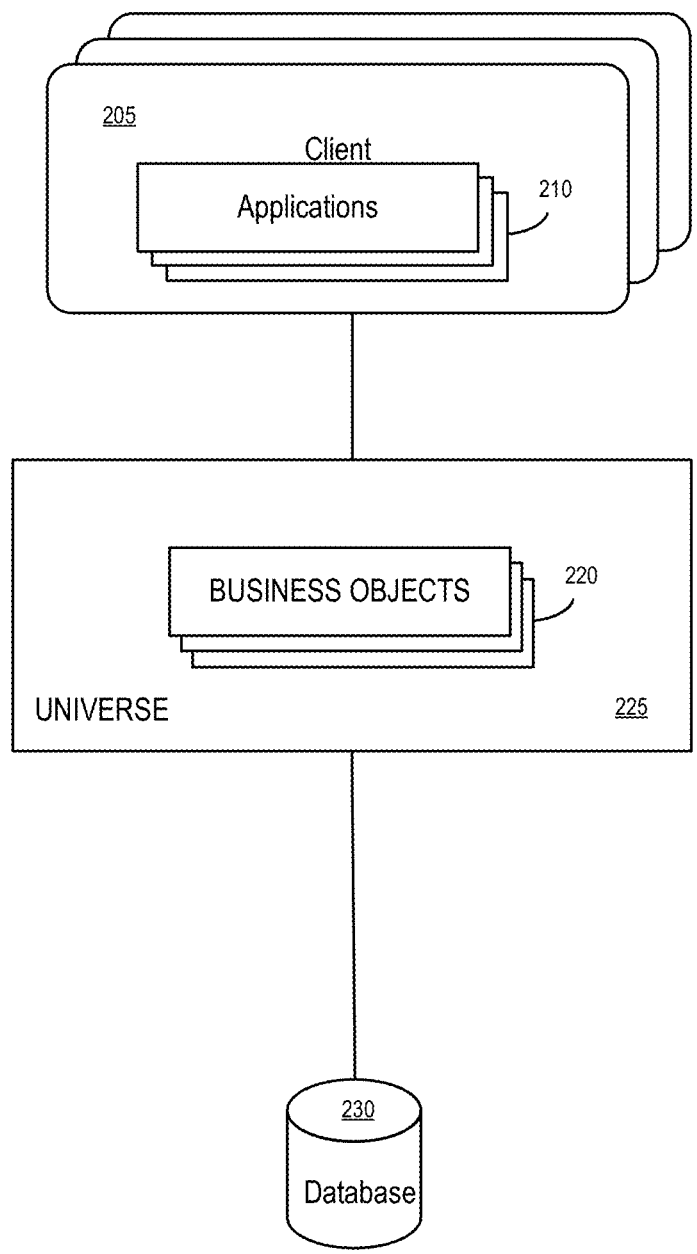
FIG. 2 is an illustrative schematic diagram of a system.

FIG. 2 is an illustrative block diagram of an architecture or system 200, in one example. Examples of some embodiments of the present disclosure are not limited to the particular architecture 200 shown in FIG. 2. System 200 includes one or more client devices 205 running one or more applications 210. Applications 210 may, in some embodiments, include a suite of different software applications having, at least to some extent, related functionality, similar user interfaces, and some ability to exchange data with each other. Applications 210 may include different software applications that support the operations and process of an organization.

System 200 includes a semantic layer universe 225 comprising a plurality of business objects (BOs) 220. Universe 225 is logically located between an enterprise's or organization's source of data stored on data store 230 (e.g., an in-memory database) and a consumption level including clients 205 where users can create queries via, for example, user interfaces, Ills, (not shown in FIG. 2) of the applications 210 executing, at least in part, on the clients.

Universe 225 is an abstraction of data source 230 that maps complex data into descriptive terms used across the organization. Some example terms include "Revenue", "Margin", and "Costs". Universe 225 is separate and distinct from the data source 230. Universe 225 includes objects (e.g., "Product", "Customer", and "Region") that are grouped into classes and mapped to the data in the database 230. The data in database 230 may be accessed using, for example, plain language names, through queries from applications 210. Universe 225 may be created or authored by a "universe editor" (not shown). The universe editor may include a UI that provides a mechanism for a user to design universes using, for example, drag-and-drop techniques to interact with graphical representations thereon.

In some aspects, a universe administrator or other authorized entity in defining a universe may consider and attempt to anticipate what data features, access, and relationships end users/consumers may want and need. After defining the objects and constraints of a universe, the universe administrator may author and publish the universe so the end users can see, access, and use it to interact with the database supporting the universe.

In some aspects, universe 225 may be used by the different applications 210, where applications 210 may correspond to different applications or services offered by a software provider. As such, the data representations of universe 225 may be a valuable asset and aspect to the on-going functionality of an associated organization, including objects representing operational and analytical processes of the organization.

In some aspects, it can be vital that the integrity and accuracy of universe 225 be securely maintained. In some embodiments, universe 225 may be read-only by users, thereby preventing users from changing data that might be critical or relevant to an enterprise and parts thereof. Universe 225 may however be modified by an entity having a sufficient security clearance to making changes thereto such as a universe editor (not shown). In some embodiments or contexts, a universe may be periodically updated or otherwise modified to reflect changes to the organization and/or its processes and methods of operation. However, a universe might be modified occasionally, about, in some instances, once every three to six months.

In one example, a client 205 executes an application 210 to present a query panel (QP) via a user interface (UI) to a user on a display of client 205. The user manipulates UI elements within the UI to indicate a query by selecting one or more graphical representations of BOs, where a server or service embodying universe 225 operates to generate one or more SQL statements that are sent to database 230. Database 230 may execute instructions corresponding to the SQL statements to generate query results (i.e., data mapped to the objects selected by the user). The query results may be presented to the user in a view including, for example, a report, a dashboard, or other record.

Data store 230 may comprise any data source or sources that are or become known. Data store 230 may comprise a relational database, a HTML document, an eXtendable Markup Language (XML) document, or any other data storage system storing structured and/or unstructured data files. The data of data store 230 may be distributed among several data sources. Embodiments are not limited to any number or types of data sources.

Data store 230 may implement an "in-memory" database, where a full database is stored in volatile (e.g., non-disk-based) memory (e.g., Random Access Memory). The full database may be persisted in and/or backed up to fixed disks (not shown). Embodiments herein are not limited to an in-memory implementation. For example, data may be stored in Random Access Memory (e.g., cache memory for storing recently-used data) and other forms of solid state memory and/or one or more fixed disks (e.g., persistent memory for storing their respective portions of the full database).

Figure 3:
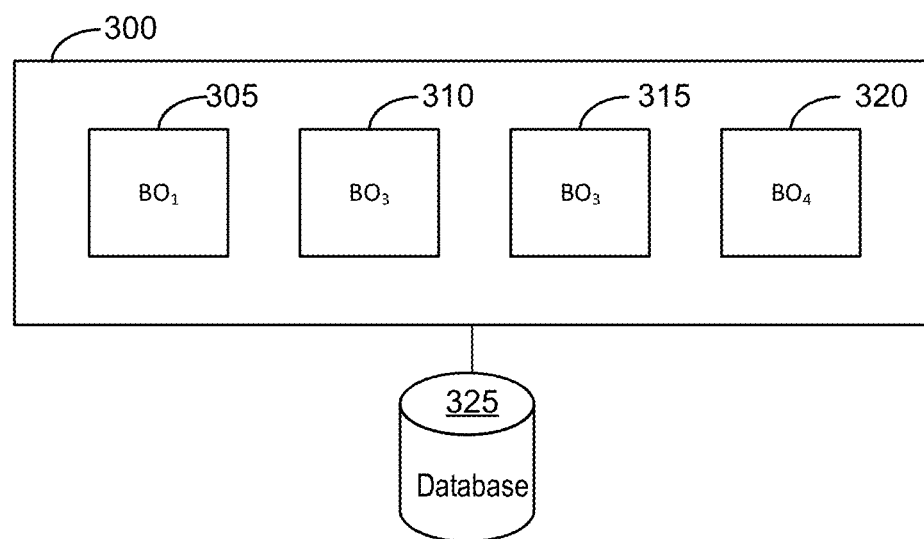
FIG. 3 is an example schematic embodiment of a semantic layer universe.

FIG. 3 is an illustrative depiction of a semantic layer universe 200. Universe 300 may be created (i.e., authored) by a universe designer or other authorized entity via a universe editor UI tool, feature, application, or service. Universe 300 includes, by way of example, BOs 305, 310, 315, and 320. Each of the BOs in universe 300 are representations of model-based data structures having fields and attributes, where each BO is defined by metadata associated therewith. Universe 300 is a metadata semantic layer and does not itself contain data. The data corresponding to the BO representations in the semantic layer universe 300 is stored in a database (e.g., FIG. 1, 130) or other data store. Reference numeral 325 refers to a database, database management system, an instance of a database node, or other data source storing the data mapped to BOs 305, 310, 315, and 320. FIG. 3 is a simplified example of a universe and specific implementations of a universe may include thousands of BOs representing different aspects of an enterprise.

In some contexts, a user or other entity may want to enrich an existing or new universe (e.g., 225) to include innovations such as, for example, additional or different methods and data representations and relationships not offered by an organizations' semantic layer universe. In some example embodiments, the innovations may occur rather frequently as compared to the lifecycle of the universe and may further relate to a specific subset of applications 110 and/or users thereof. In some aspects, a "set" may be created by a user (e.g., a set designer working to implement desires of end users) to define a method to produce, for example, a list of unique and homogeneous data-mart identifiers (Customer IDs, Product IDs, Transaction IDs, etc.). The set is created on top of the BOs of universe 125, where the set is also a semantic entity and includes at least some aspects (e.g., fields, attributes, methods, and metadata) of the objects of the universe. A set herein may include other aspects or features, in addition to the one or more BOs (or parts thereof) on which it is created or based. In some aspects, the set may be updated or created on a daily or even shorter timeframe.

Figure 4:
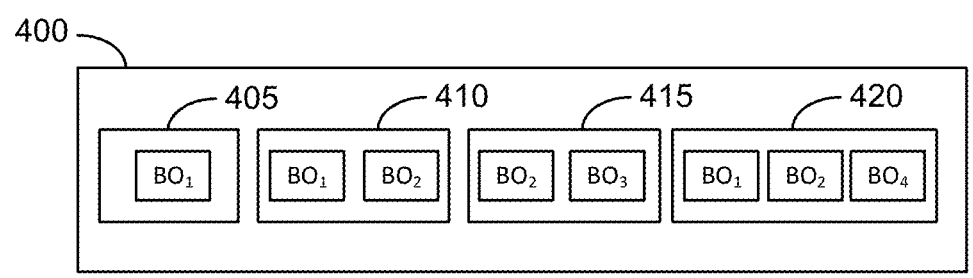
FIG. 4 is an example schematic embodiment of a semantic layer set.

FIG. 4 is an illustrative example of semantic layer sets or simply "sets". In the example of FIG. 4, the depicted sets include set 405, set 410, set 415 and set 420. Each set is defined and created on top of one of more objects (i.e., BOs) from the universe that it is associated with. The sets of FIG. 4 are associated with universe 300 of FIG. 3. As such, each set in FIG. 4 is created on top of or is based on one or more of the BOs of universe 300. As depicted in FIG. 4, set 405 is created on top of BO1 from universe 300; set 410 is created on top of BO1 and BO2 from universe 300; set 415 is created on top of BO2 and BO3 from universe 300; and set 420 is created on top of BO1, BO2, and BO4. As used herein, a set that is created on top of a BO means that the set includes at least some of the characteristics (e.g., fields, methods, and attributes) of the underlying BO, as well as the associated metadata of the BO. In some embodiments, the underlying BO may be unaltered, whereas the underlying BO may be altered in some embodiments (e.g., some attributes not used or changed). The sets in FIG. 4 are further shown as being grouped together by a set container 400. The example of FIG. 4 illustrates one set container including four sets. A universe may have multiple set containers linked or associated therewith, as defined by a repository relationship.

Figure 5:
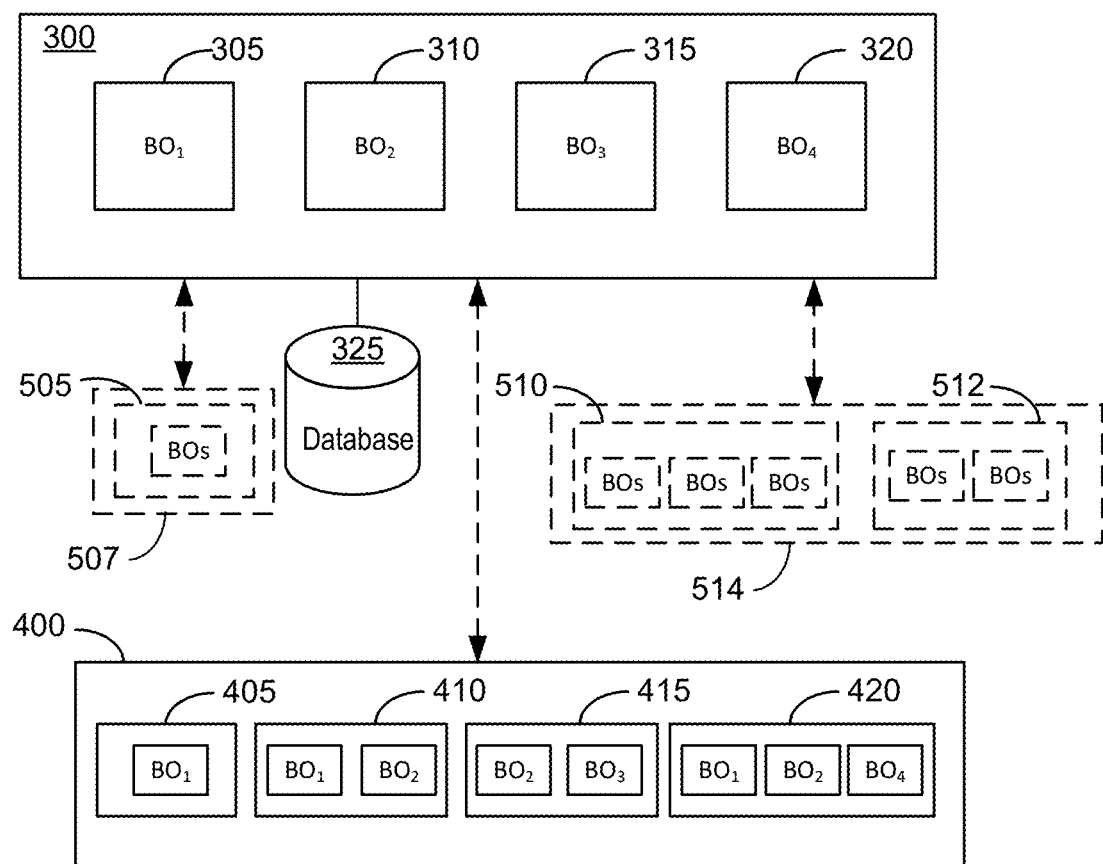
FIG. 5 is an example schematic embodiment of a consolidated semantic layer universe.

FIG. 5 is an illustrative depiction of a semantic layer universe 200 and the set container 400 being linked together by a repository relationship, as depicted by the dashed line arrow between the universe and set container 400 including sets 405, 410, 415, and 420. The repository relationship defines the connection or association between universe 300 and the sets 405, 410, 415, and 420 included in set container 400. FIG. 5 further illustrates that universe 300 may be linked to one or more set containers, each including one or more sets that in turn are created on top of one or more objects of the universe. As illustrated in FIG. 5, semantic layer universe 300 is further linked to set containers 507 and 514, where set container 514 includes sets 510 and 512 and set 505 is included in set container 507. In the example of FIG. 5, set containers 507 and 514 and the contents therein are depicted as dashed lines to further indicate that these set containers are newly created extensions of semantic layer universe 300.

In some aspects, including but not limited to security concerns and an incompatibility in lifecycles, a universe and one or more sets relating thereto might not be merged. For example, enhancements and features that might be desired by some users and not included in a semantic layer universe might not be added to the universe at an authoring level of the universe where the universe is created and published. However, in accordance with some example embodiments herein, features enabled by one or more (new) semantic layer sets may be consolidated with a universe to add, from a user's perspective, the technical features and enhancements of the one or more sets to the universe at a consumption level where the user creates a query of a database via the universe.

FIG. 6 is an illustrative flow diagram of an example process 600 for authoring extensions to a semantic layer universe. At operation 605, a universe is published to expose its objects (as defined herein) to another entity, application, service, or system. The semantic layer universe of operation 605 may include one or more of the characteristics disclosed herein and the objects of the universe may be associated with a data source such as a database (e.g., an in-memory database).

Operation 610 includes creating set containers that may be linked to the semantic layer universe published in operation 605. In some instances, a set designer may create one or more set containers at operation 610, where the set containers are semantic layer entities that are separate and distinct from the semantic layer universe 300. Operation 610 is directed to the creation of the one or more set containers. As such, the set containers do not yet include any sets. As a repository resource itself, a set container may have a level of security applied to it.

Proceeding to operation 615, the semantic layer universe published at operation 605 may be linked to or otherwise associated with one or more of the set containers created at operation 610. In some embodiments, the universe and the set containers may be linked to each other via repository relationships defining a dependency therebetween. The repository relationships may be expressed in metadata that may be stored in a location separate and distinct from the universe.

At operation 620, sets are created on top of the universe's BOs. The sets are also a semantic layer entity and may represent collections of data (e.g., methods, entities, etc.) that differ from the BOs of the universe from which the sets' BOs are derived. In some embodiments, sets may be designed by a set designer using a dedicated sets editor that is a design tool strictly for defining sets. In some embodiments, only BOs available to the set designer in accordance with their role and security privileges can be created by a given set designer. The sets generated at operation 620 may be grouped into the one or more set containers linked to the universe at operation 615. The sets can be published for viewing and usage as being grouped into set containers. The set(s) are a semantic entity and are not stored in the universe, rather the sets are stored elsewhere.

Process 600 may, in some embodiments, include all of the operations shown in FIG. 6, include fewer than all of the operations of FIG. 6, and comprise a portion of another process.

Figure 7:
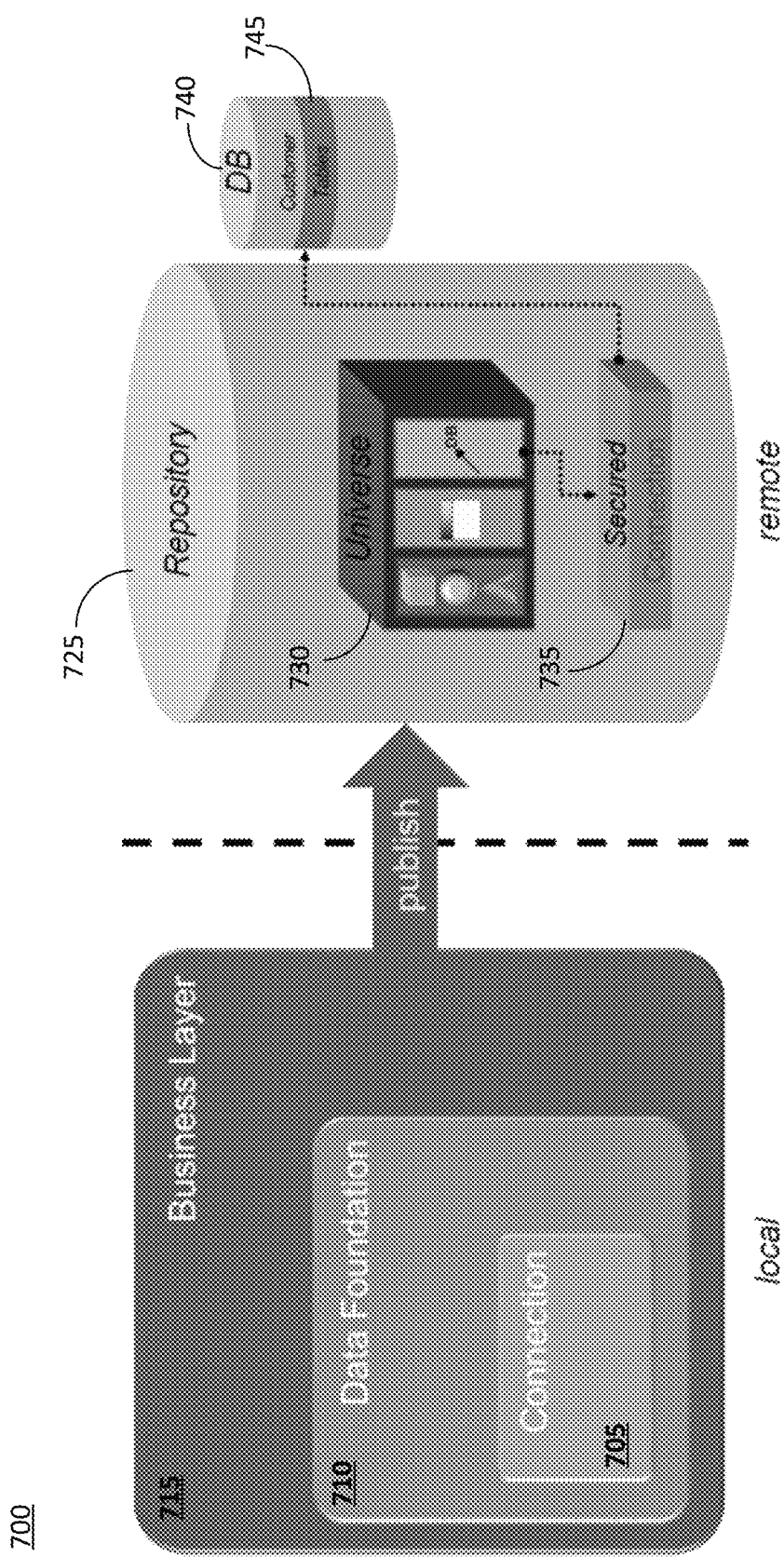
FIG. 7 is an example architecture including a consumption universe.

FIG. 7 is an an example logical depiction of an architecture overview 700 for the publishing of universes, in some embodiments. In some aspects, in order to be published local files (e.g., connection 705, DF 710, and BL 715) may be packaged into a single InfoObject 720 exposed as a secured consumption universe. By publishing universe 730, connections(s) 705, DF 71, and BL 715 are exported to repository 725, where they may be accessed by reporting tools. A transient version of universe 730 may be generated for consumption purposes via a secured connection 735 and stored as customer tables 745 on database 740.

FIG. 8 is an illustrative flow diagram of an example process 800 for querying a semantic layer universe and extensions thereof (i.e., semantic layer sets linked to the given universe). At operation 805, a determination is executed to ascertain the set containers, if any, linked to the given universe. Operation 805 and process 800 may be invoked or triggered in response to a query of the given universe. The query may be initiated by an end user interacting with a system (e.g., system 200) via a UI query panel (QP). In some embodiments, some aspects and characteristics of the universe, such as repository relationships of the universe to be queried, can be examined to determine all of the set containers linked to the universe.

At operation 810, the set containers available to the querying entity based on that entity's role and corresponding security access levels or privileges are retained. Set containers not available due to security constraints may be discarded from further consideration with respect to the current query. Operation 815 further includes retaining the BOs in the set containers retained at operation 810 that are allowed based on the querying entity's role and corresponding security access levels or privileges. The BOs not available due to security constraints may be discarded from further consideration with respect to the current query. At operation 820, the allowed set(s) available to the querying entity based on that entity's role and corresponding security access levels or privileges are retained. At operation 820, the allowed sets will include the allowed BOs as determined at operation 815. The allowed set(s) will be retained and the other, non-allowed set(s) can be discarded from further consideration with respect to the current query.

At operation 825, a consolidated view of the relevant BOs and allowed set(s) may be presented to the end user that invoked the query. In some instances, the consolidated view is presented in a UI of the tool, application, or service that provided a point of interaction for the end user to initiate the query.

According to process 800, appropriate set containers of a given universe are collected at the semantic layer level based, at least in part, on the repository relationships of the given universe at the time the query is initiated and presented to the system. Further, the relevant sets are consolidated with the relevant BOs of the given universe for consumption of the end user. This consolidated universe including the semantic layer aspects of the relevant set(s) is transient and is referred to herein as a secured universe. The secured universe, as illustrated by the operations of FIG. 8, can restrict the view presented to the end user to include reflect the security privileges of the user.

Process 800 may, in some embodiments, include all of the operations shown in FIG. 8, include fewer than all of the operations of FIG. 8, and comprise a portion of another process.

In some aspects, an end user may be presented with a view of the consolidated universe that is extended to include the security-cleared sets. In some embodiments, an end user may see the features, methods and other data representations (e.g., a new BO created in a newly created set). However, whether the features or methods are part of the universe created during a universe creation phase or part of a universe consolidation generated dynamically at the time of a query execution may not be revealed or otherwise indicated to the end user.

In some embodiments, the consolidated, secure universe is generated dynamically when needed (i.e., in response to a query). The consolidated or merged universe including the original universe and the relevant set(s) may be stored separate and apart from original universe. The merged universe may be implemented as an in-memory copy, decoupled from the original universe. In some aspects, the sets may be viewed as "filters".

Figure 9:
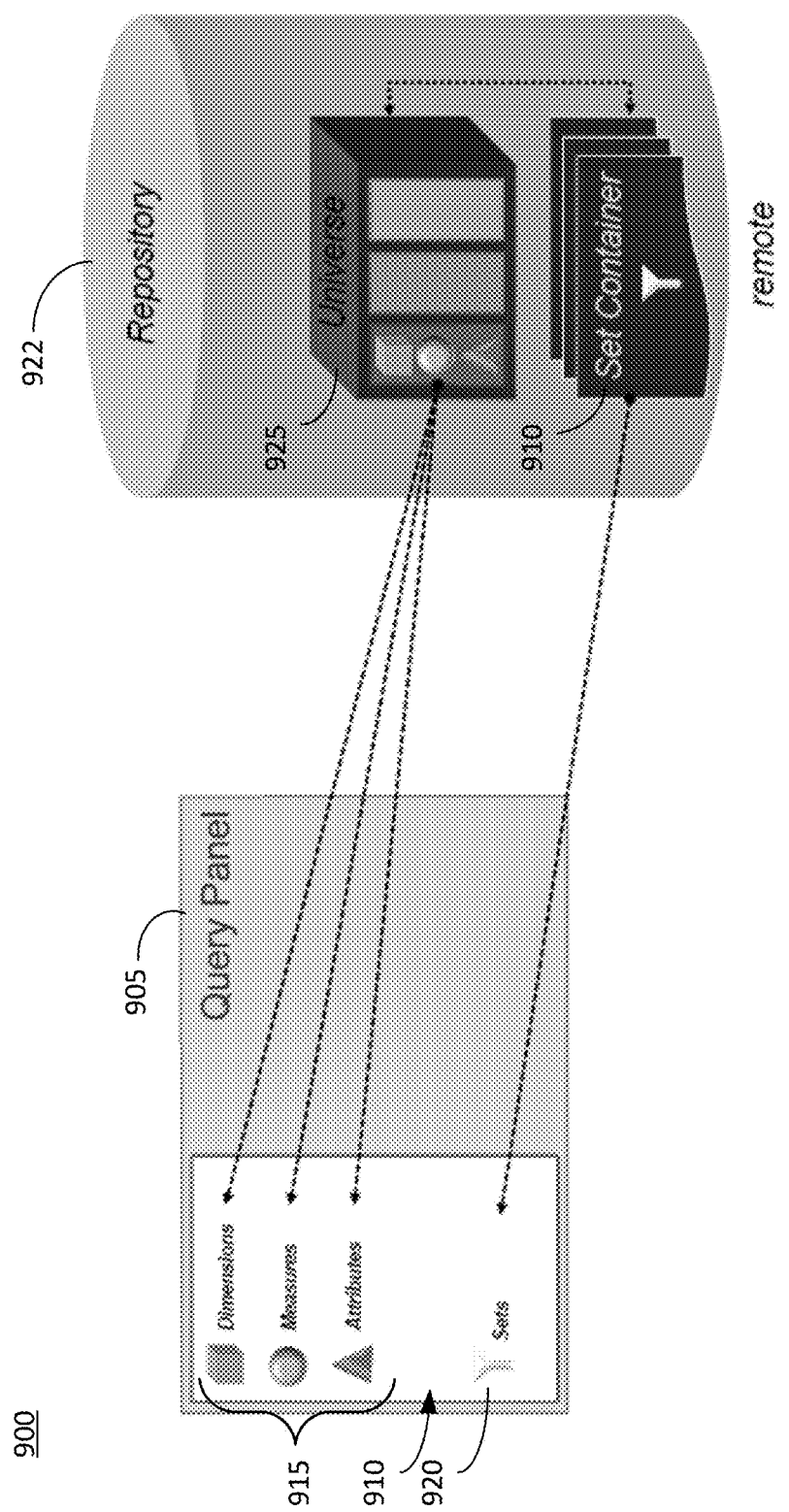
FIG. 9 is an example architecture including an external augmentation.

FIG. 9 is an example of a logical depiction of an architecture overview 900 that may relate to external augmentation aspects, in some embodiments. In some aspects, when a user interface such as, for example, a Query Panel (QP) 905 is opened in a reporting tool, an aggregated view 910 of a secured (i.e., transient) universe's 925 objects 915 and sets 920 of set container(s) 930 on a remote repository 920 may be displayed to an end user (e.g., a customer), wherein a reconciliation of the objects 915 and the sets 920 occurs on-the-fly at runtime.

Figure 10:
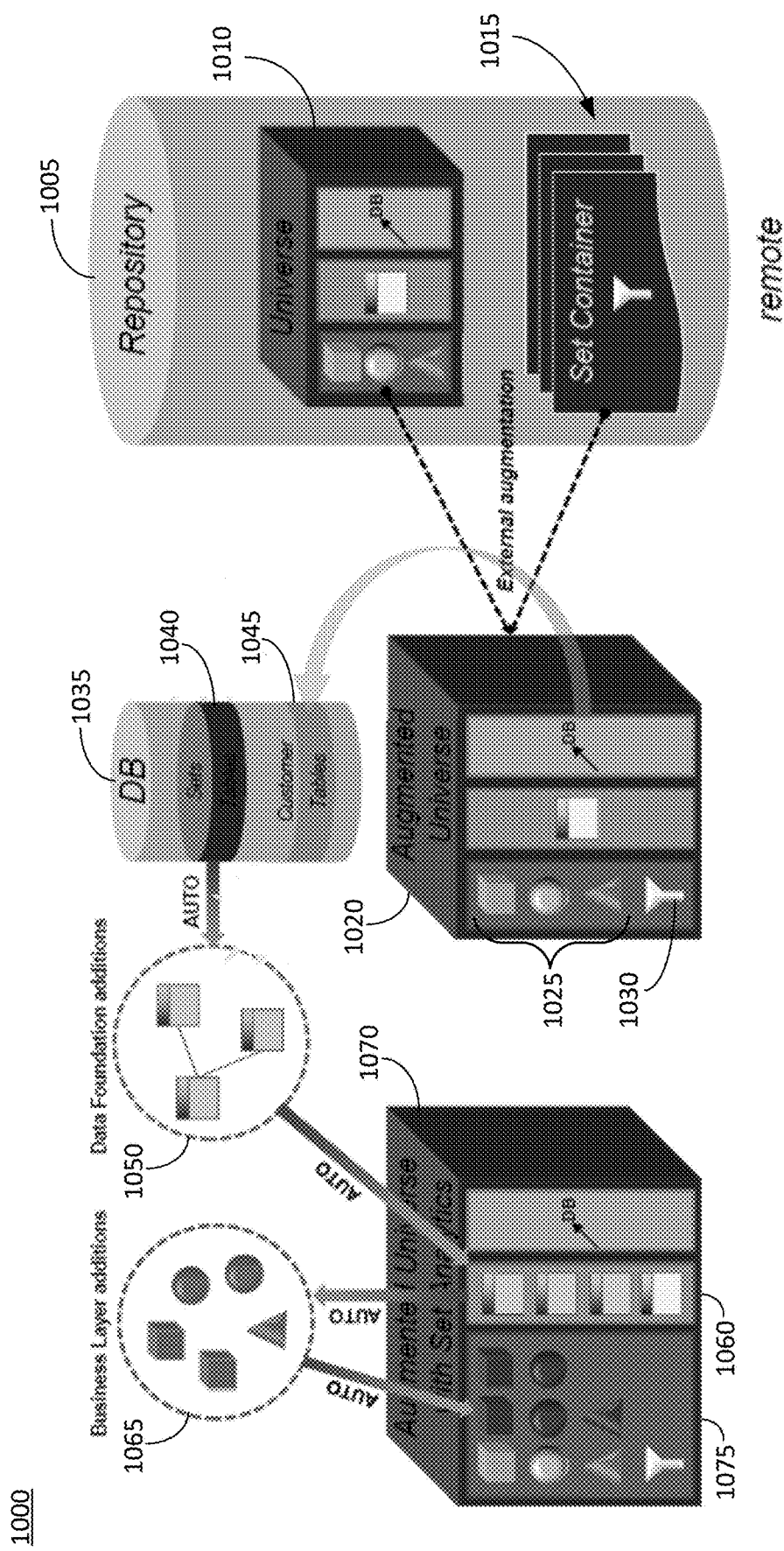
FIG. 10 is an example architecture of a platform supporting augmented universes with set analytics.

FIG. 10 is an example of a logical overview of an architecture or platform 1000 relating to methods and systems for augmentation of a universe with set analytics, in some embodiments. In some aspects, platform 1000 includes a repository 1005 having a universe 1010 and set container(s) 1015 that each contain one or more sets. As discussed above (e.g., FIG. 9), an augmented universe 1020 including objects 1025 and sets 1030 may be generated based on universe 1010 and set container(s) 1015. In some embodiments herein, it might be possible or otherwise permissible to write-back sets-specific tables 1040 on to a user (i.e., customer's) database 1035, where database 1035 also stores customer tables 1045. In some aspects herein, sets-specific tables 1040 might be used to automatically generate (e.g., without intervention and/or assistance from a customer/user) pre-packaged or predetermined (i.e., "pre-canned") analytics based on the sets-specific tables 1040. In some aspects, the automatically generated analytics might be generated on the basis of DF additions 1050 or fragments being automatically generated based on sets-specific tables 1040. The DF additions 1050 may be automatically injected into the universe at 1060, where Business Layer additions 1065 may be automatically generated based on DF additions 1050 and further injected into the universe 1075 to obtain augmented universe with set analytics at 1070. As illustrated, objects 1075 of the augmented universe with set analytics 1070 includes the dimensions, measures, attributes, and sets further automatically generated based on the sets-specific tables 1040 and the DF and BL additions automatically generated based thereon. Details related to various aspects of FIG. 10 are disclosed in greater detail hereinbelow.

In some aspects, the BL objects 1075 generated as illustrated in FIG. 10 may be created based on sets tables 1040 by a developer, administrator, vendor, supplier, or other entity provider of remote repository 1005, wherein a schema of a customer or user's database may be leveraged to store the set-related objects. These set-related objects or artifacts provisioned by the developer or administrator might be used and queried by the customer, in some instances similar to the customer's own data tables (e.g., 1045). In some instances, the customer might be able to query their own data, as well as the objects provisioned by the developer.

In some aspects, features disclosed herein may provide mechanisms for automatically providing business objects representing pre-determined analytics to a customer or other user.

In some aspects, sets may store some metadata and membership data in a customer's database. A process referred to as materialization may issue data manipulation language (DML) and data definition language (DDL) SQL on the customer specified database to generate membership (i.e., lists of IDs) for each defined set. This data is stored in dedicated tables created automatically by the system.

For a customer to consume these tables in a Query Panel (or other reporting tool user interface), one would typically need to add the tables to their DF, as well as fully understand how these tables are related to their own (i.e., customer) tables. Best or suggested practices would also suggest that such process(es) ensure that no loops or other ambiguities are created and that the integrity of the DF is maintained. Additionally, relevant and meaningful Business Objects (BOs) would need to be created based on these set tables.

In some regards, this might be a complex and time-consuming process. Some embodiments herein operate to alleviate this complexity by auto-generating the DF and BO's and providing access to the same to a customer, thereby, in some instances, providing a mechanism for a customer to access the set metadata and membership in a QP (or other reporting tool interface) to assist in creating analytics.

In some aspects, a set container is fully aware of what tables it contains or owns and stores this information internally. This table-related information is stored so the system can continue to manipulate (e.g., Insert, Update, Delete, etc.) the data and tables as needed.

Figures 11, 12:
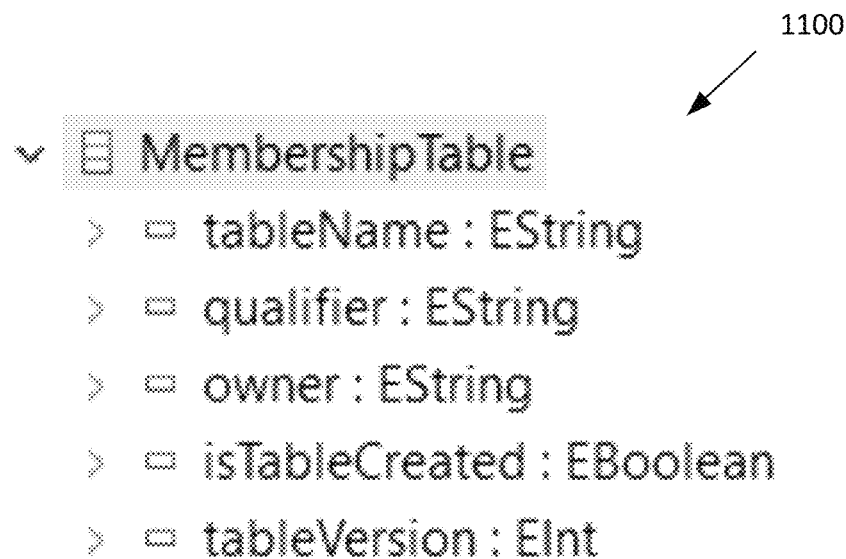
FIG. 11 is an example embodiment of container set information.
FIG. 12 is an example embodiment of container set table description.

FIG. 11 is an illustrative depiction of information 1100 a set container might store for each table it owns. In addition to specifying a name, qualifier, owner, indication of table version, and other information, each table may have a specific structure based on the data it might store. The specific structure may be specified by, for example, a table description "TableDesc". An example format for TableDesc for a set table is illustrated in FIG. 12. The table information outlined in FIGS. 11 and 12 may be used to add the sets tables included in a set container to a customer's DF.

In some embodiments, a DF table may be created for each set table based on the information stored in a set container and describing the set tables therein. In some embodiments, a process for creating a DF table is performed automatically based on the stored information, without intervention or assistance from a customer. FIG. 13 includes example code 1300 that might logically create a DF table for each set table in a set container. The code 1300 might be executed to automatically generate DF tables based on the knowledge of each set table (e.g., schema, etc.), as represented by the stored set container information. As seen, sample code 1300 includes statements to create, when invoked, a DF table, including specifying the columns therein based on what is in the customer's database. In some aspects, depending on a connectivity used, the DF table being created may have to be delimited, as seen at 1305. The delimitation of a table determines whether the connection server specifies it delimits the table.

Figures 14, 15:
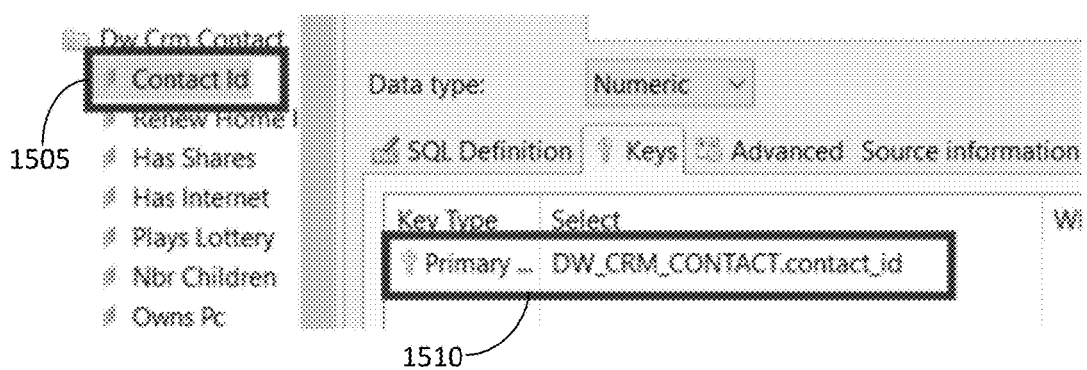
FIG. 14 is an example embodiment of sample code for creating a TableView.
FIG. 15 is an example embodiment of a user interface illustrating a Primary key for a Business Object.

While FIG. 13 includes an example of code to create a DF table, FIG. 14 includes an illustrative example of code to create a corresponding user interface (UI) aspect (e.g., TableView) to surface, when executed, the metadata of a created DF on a display screen. Without a TableView, the DF tables will not be visible in, for example, a DF editor.

In some aspects, a DF table includes the metadata that is bound to a customer's database schema, while the TableView is the UI aspect that surfaces the DT table on a display screen.

As an example, a table in a customer's DF might appear in a MasterView, as well as a secondary view. The secondary view might be a Geography view. The Geography view might only show tables that are bound together by a geographic meaning or definition. Yet another view might be a "Products" view, wherein only tables having a products relationship are shown. In this present example, a table "Country" might be presented in three different views, including a MasterView, a GeopgraphyView, and a ProductsView. Depending on a context, the one table "Country" can appear in different contexts. A TableView created for each context addresses the UI graphical aspects corresponding to the table "Country".

In some embodiments, particular tables referred to herein as "Subject" tables are used to store all set membership based on a specific subject. These tables are important as they are the only set tables to join directly to a customer table(s). Other set tables might have internal relationships. Subject tables provide a mechanism to link DF tables to a customer's table.

A customer defines the Subject based on what category of sets they would like to build, for example, sets based on "customers" or "products". In some aspects, one or more BO's may be part of a Subject, where each BO is bound to a Primary key column in the DF. As an example and referring to FIG. 15, the "Customer" Subject will contain a BO 1505 called "Contact Id", which is bound to Primary key column "contact id" 1510 from a table in the DF.

Based on an identified/determined subject BO for a customer database, the Subject table can be joined to the correct Customer table. A set table is joined to the primary key column of a customer table, where the customer has defined the primary key for their table. In the example illustrated in FIG. 16, a join is shown between the Customer table 1605 (i.e., "DW_CRM_CONTACT") and the automatically generated subject table 1610 (i.e., "set_subjXXXXXXXXX"). Moreover, based on the internal schema depicted in FIG. 15 "id" must connect to the customer's schema by "contact.id" based on the Primary key information shown.

Figures 16, 17:
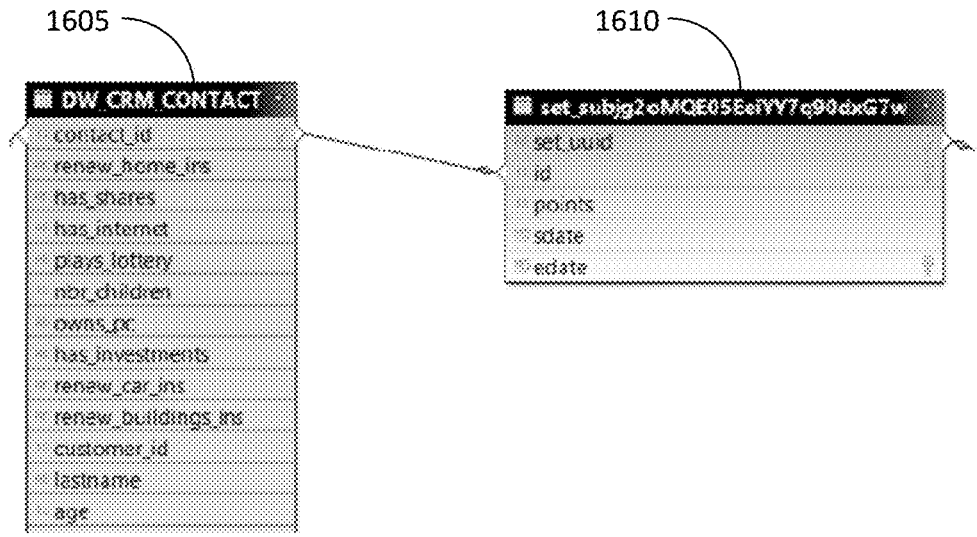
FIG. 16 is an example depiction of a subject table joined to a customer table.
FIG. 17 is an example embodiment of sample code for specifying columns for a join.

In the example code shown in FIG. 17, the left columns and right columns are specified for the required join at 1705. Thereafter, a join is generated at 1710 between the Customer table and the subject table, including setting the cardinality of the join at 1715. It is noted that this process is completed for every subject defined by the customer. In some aspects, one join is sufficient per subject (e.g., three subjects can be joined by three joins).

Set tables other than Subject tables (i.e., other tables) are created in a same way as the subject table, but the joins are all defined between the set tables and not to external customer tables (e.g., a subject table). Given the joins between the set tables are internal to sets and do not change, joins of the other tables (i.e., tables other than Subject tables) can be programmatically created as needed.

In some aspects, a process of creating joins for set tables other than a Subject table may be the same as or similar to the process disclosed for a subject table. However, a difference does exist because a different list of left columns and right columns is specified to create the join depending on the known structure and connections between set tables. The structure and internal connections between the other set tables is fully known by a developer, administrator, etc. since they "own" all of the other set tables, in contrast to the Subject table scenario.

In some aspects, a consistent set or cluster of tables (i.e., other tables) may be created and then this set of tables may be attached to the customer's table with one join from a created Subject table.

In accordance with some design practices and/or quality controls, loops might be avoided in the design of the DF by ensuring all paths within the DF are well defined so there are no ambiguities. Adhering to this design principle, may be particularly important in the context of auto-generating the DF, in some embodiments herein.

While there is one table per subject in some embodiments, the other tables that store metadata related to sets may be shared by all subjects. This aspect might cause loops between subjects, leading to errors in the DF and query generation. For example, multiple subjects might join to the same metadata tables, thereby causing an ambiguity.

In some embodiments, potential ambiguities may be addressed by using Alias tables to avoid loops, where the Alias tables seamlessly integrate with any existing customer design. Loops may be avoided by having a first subject that generates joins directly to the core metadata tables. Thereafter, subsequent subjects will join to alias tables of these core metadata tables and thereby avoid direct loops.

In some aspects, a table may be present just once. For example, a set "history" is created for a first subject. Here, no alias is needed. For a second subject, we again need to refer to the set "history". Since the set "history" is already present, an alias may be created to avoid a loop by joining to the set "history" again. The thus created alias of the set "history" may be referenced by the second subject. In some instances, additional aliases may be generated to accommodate additional subjects and avoid loops.

Figure 19:
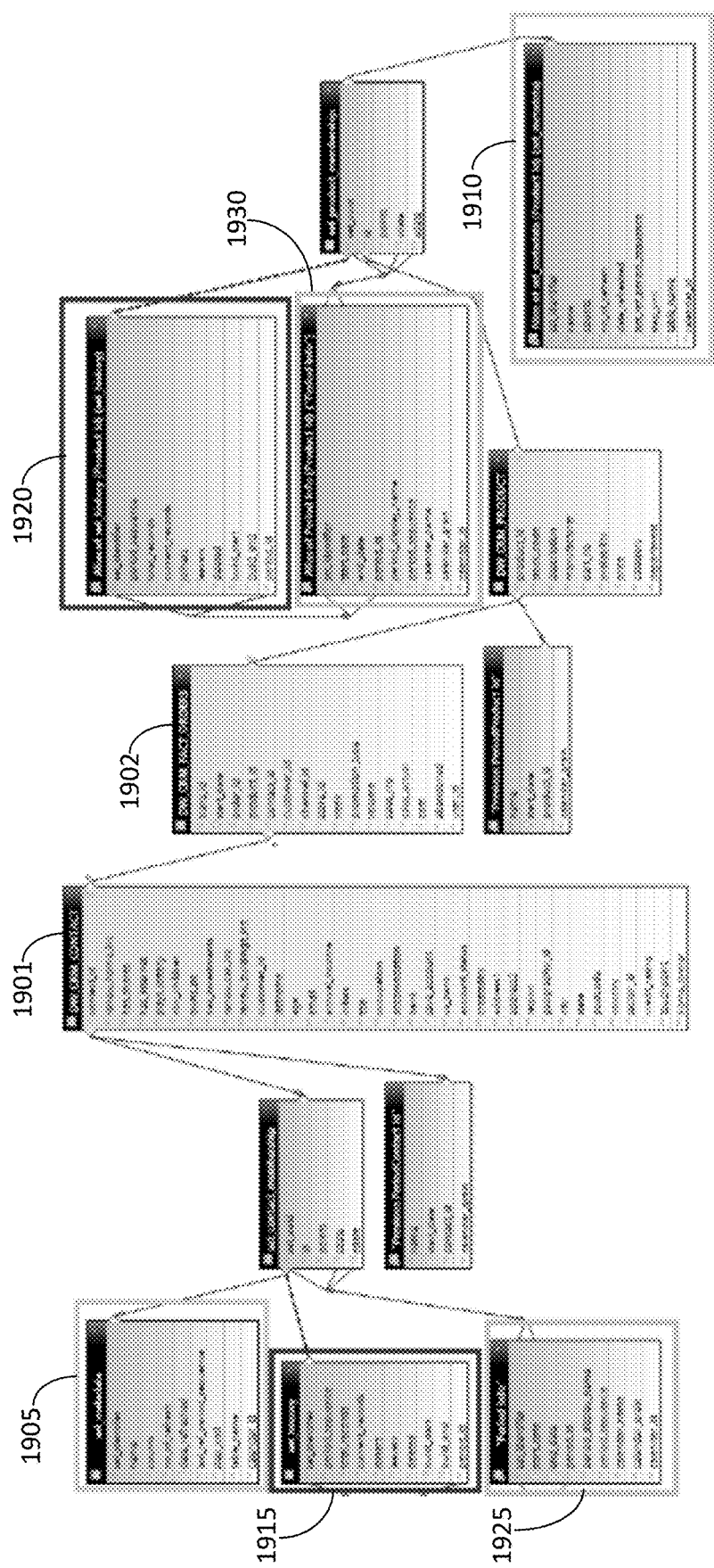
FIG. 19 is an example depiction of tables joined together, including original tables and aliases thereof.

FIG. 18 includes an example of sample code to create alias tables for an original core table. In some aspects, aliases may be generated automatically. Referring to FIG. 19, an original table 1905 and a corresponding alias table 1910 are shown. Additionally, original table 1915 and a corresponding alias table 1920, as well as original table 1925 and a corresponding alias table 1930 are also shown. As shown, "set contact membership" table 1903 is joined to "history" table 1915, whereas "set_product membership" table 1904 is related to an alias history table 1920. Similar relationships are seen with tables 1905 and 1925 and their alias 1910 and 1930, respectively.

In some aspects, a database can have Views, where a View herein is a combination of multiple physical tables being displayed as one virtual table. In the context of the DF, these virtual tables are referred to as Derived Tables. In some embodiments, derived tables may be auto-generated in instances where it is determined there is no use-case to directly to include the physical tables. In some such scenarios, two or more physical tables may be combined into one derived table, where this derived table may be added to the DF instead of the multiple physical tables.

In some aspects, a SELECT statement may be used to define a derived table. FIG. 20 includes a SQL sample listing for joining two physical tables to appear as one table. The sample code of FIG. 20 relates to a specific problem related to temporal sets with calendars including calendar IDs and period IDs. The referenced tables provide user-friendly date representations and period (i.e., ordinal) representations. By having a query on a derived table, an end user might be presented with a calendar date, as opposed to a period/ ordinal representation. In some aspects, derived tables provide a technical mechanism to display a query result in a specific, particular manner. In some aspects, a view may be presented to a user based on desired data of a virtual table, as opposed to data as included in a physical table. Furthermore, this expression may be used to create a derived table, as seen in FIG. 21.

In some situations and use-cases, a simple join may not be sufficiently powerful or useful and a more complex mechanism may be needed. In some aspects, such scenarios might be addressed by using a SQL statement describing the complex join. For example, FIG. 22 includes an illustrative example of a SQL statement defining a relationship that may be more complex than simply one attribute being associated with another attribute. FIG. 23 further graphically illustrates the complex join defined in FIG. 22.

FIG. 24 is an illustrative flow diagram of an example process 2400 for augmenting a semantic layer universe with data foundation additions or fragments universe. At operation 2405, at least one data foundation table is created for addition to a database. The owner of the database may be a customer (or other user) of a database management product or service, wherein the customer maintains the database separately and distinctly from a repository of data owned by an administrator or other entity providing and/or supporting the database management product or service. The at least one data foundation table may be created based information stored in a semantic layer universe of the customer in a first set container therein. The first set container may store one or more sets and information (e.g., metadata) regarding the sets. The stored information may specify the contents of each set, as well a description or specification of the structure of each set. This stored information may be used to create the at least one data foundation table that is consistent with the customer's database. As such, the at least one data foundation table created by process 2400 may be used by the customer consistent with their operations and workflows.

At operation 2410, particular tables of the data foundation tables created at operation 2405 may be linked to a customer table in the customer's database. The "particular" tables linked to a customer database in operation 2410 may be the Subject tables disclosed herein (e.g., FIGS. 15 and 16). As discussed above, Subject tables may be the only set tables to join directly to a customer's tables. In some aspects, a customer defines a Subject based on what category of sets are relevant to them (e.g., customers, products, etc.). Based on a determination and/or identification of subject BOs for a customer database, process 2400 operates to join a set table to an appropriate customer table. In some embodiments, the set table is joined to a primary key of a customer table.

At operation 2415, all of the created data foundation tables (i.e., data foundation fragments) are stored in a dedicated data structure hosted by the first (i.e., original) set container referenced in operation 2405. In some aspects, the DF tables created based on the set tables as disclosed in operation 2400 model the set tables and make them available in the augmented Universe and thereby expose them to the Query Panels.

Process 2400 may, in some embodiments, include all of the operations shown in FIG. 24, include fewer than all of the operations of FIG. 24, and comprise a portion of another process.

Figures 25, 26:
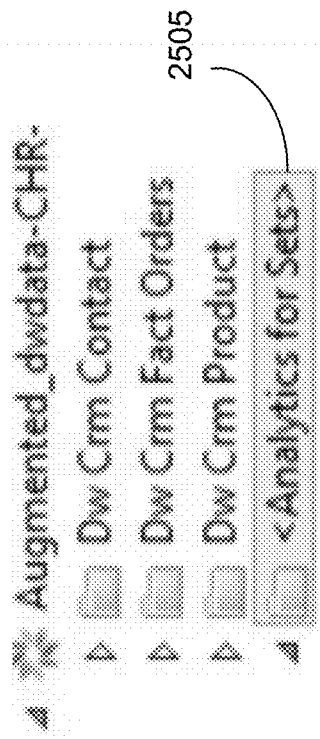
FIG. 25 is an example embodiment of an illustrative user interface.
FIG. 26 is an example embodiment of sample code for creating a folder.

Referring again to FIG. 10, business layer (BL) objects 1065 are illustrated as being built on top of DF additions 1050. In some aspects, the present disclosure includes processes and systems to provide BL objects generated on top of the DF additions in an existing universe without interfering with other (e.g., customer-created) objects already in the universe. In some embodiments, a folder may be created where the folder acts as the root for all generated objects and sub-folders. FIG. 25 includes an illustrative depiction of a file structure including a folder 2505 created to store BL objects generated on top of the DF additions. As shown, folder 2505 is added to an existing file structure 2500 of the BL of the subject universe. FIG. 26 is an example of sample code that might be used to create a BL root folder.

Figures 27, 28:
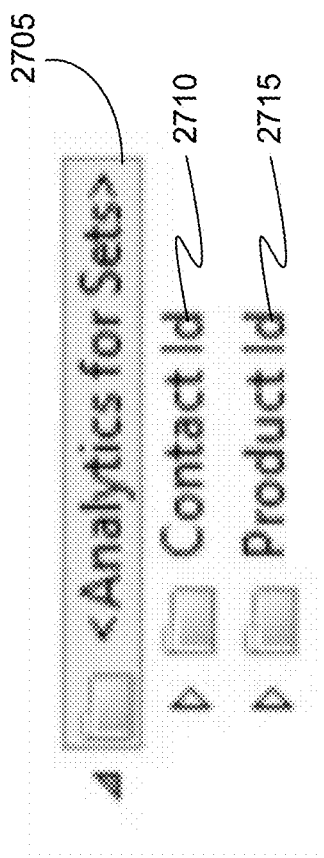
FIG. 27 is an example illustration of a data file structure.
FIG. 28 is an example embodiment of sample code for creating a folder.

As disclosed hereinabove, a group of tables may be generated per set subject, as defined in a set container, wherein these table are only generated by the materialization process. To further provide for a consumption of these tables, a universe may be organized such that each subject has a root folder and all objects related to each respective subject are contained within the root folder. Referring to FIG. 27, a root folder 2705 is shown, as well as two subjects under the generated root folder where there is one folder 2710 for "Contacts" and one folder 2715 for "Products".

In some embodiments, other methods of organization of folder and data structures might be used in addition to, instead of, or otherwise in combination with the aspects of FIG. 27.

The creation of a folder may be accomplished by a process implemented in code, such as the example code sample shown in FIG. 28.

In some aspects, generating simple BOs based on a DF includes generating one folder per table and then one object (i.e., BO) per column of the table. This task might be accomplished automatically in some embodiments herein. FIG. 29 is an example of a data storage structure 2900 for simple BOs.

As discussed above (e.g., FIG. 1), BL objects can include dimensions, measures, and attributes. Dimensions for BL objects generated based on DF additions automatically generated herein may be construct as demonstrated by the example illustrative sample code 3000 in FIG. 30. In some aspects, an important feature of constructing a BO is the expression ("selectExpression") highlighted at 3005. The expression includes the fully qualified column name, including the appropriate delimitation (if any). This string is a component of a SQL expression that will represent the BO. Regarding a simple BO, this expression is based on a single column from the DF and then applied as a binding.

In some instances, an expression as illustrated in FIG. 30 may be generated based on a DF table and a related column.

Figure 33:
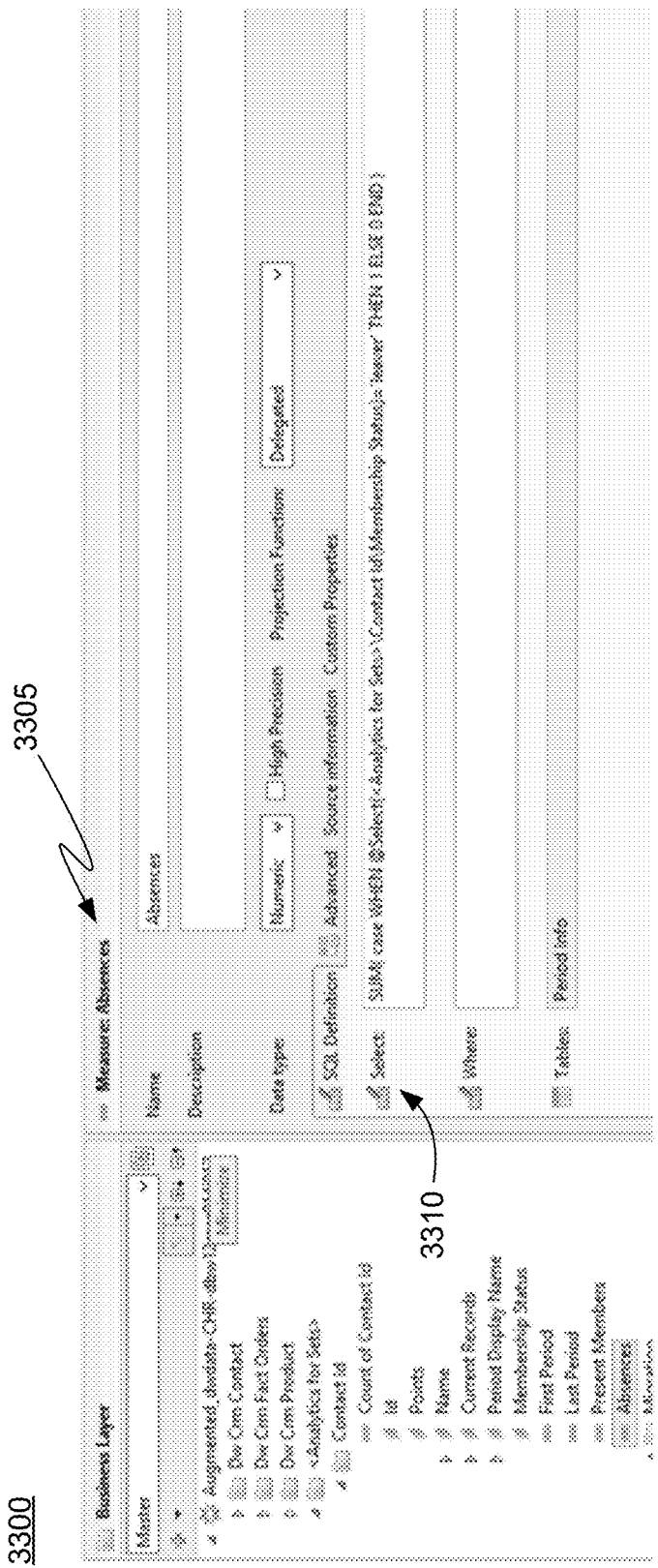
FIG. 33 is an example embodiment of user interface.

In some instances, adding many dimensions (e.g., one per column) may pollute a Universe generated herein. In such instances, attributes can be generated that are displayed under a more prominent dimension, as seen in FIG. 31. While the creation of attributes might appear to be similar to the creation of dimensions, there are with some differences. For example, the new object is created as an Attribute and not as Dimension. This distinction is seen in the following:

businessObject=BusinessFactory.eINSTANCE.create
    Attribute( );

Another difference might be that an attribute is assigned to a parent, as demonstrated by the following:

boAttributeRoot.getAttributes( ).add((Attribute)businessObject);

Regarding the creating of measures, measures might be created in a manner similar to creating dimensions. FIG. 32 includes an example of sample code that might be executed to generate measures for a BL object herein. Referring to FIG. 32, a difference with creating measures is the expression assigned to the measure, as highlighted at 3205. In some embodiments, a measure expression contains an aggregation function as shown at 3210. In one example, the code sample of FIG. 32 uses the COUNT function:

String expression="COUNT("+qualifiedTable Name+"."+col.getBusinessName( )+')';

In some instances, other functions such as, for example, MIN, MAX, SUM, etc. might be used alone and/or in combination with each other and other functions to accomplish an aggregation. FIG. 33 is an outward facing view of a user interface 3300 including graphical representations for defining measures at 3305 missing 3305 in FIG. 33, including specifying SQL definitions at 3310.

In addition to BL objects being defined by dimensions, measures, attributes thereof, filters can also be added to the BOs. In some aspects, filters may act to constrain a result to be bound to a specific subject (e.g., "Products" "Customers", etc.) In some embodiments, filters might be generated in a manner comparable to dimensions depending on requirements. In the sample code shown in FIG. 34, the "whereExpression" at 3405 is a significant part of the filter that specifies the following SQL condition:

```
Filter filter = BusinessFactory.eINSTANCE.createFilter( );
filter.setBusinessName(name);
```

FIG. 35 is an outward facing view of a user interface 3500 including graphical representations for defining filters at 3505, including specifying SQL definitions at 3510 and "where" expression thereof at 3515.

Figures 36, 37:
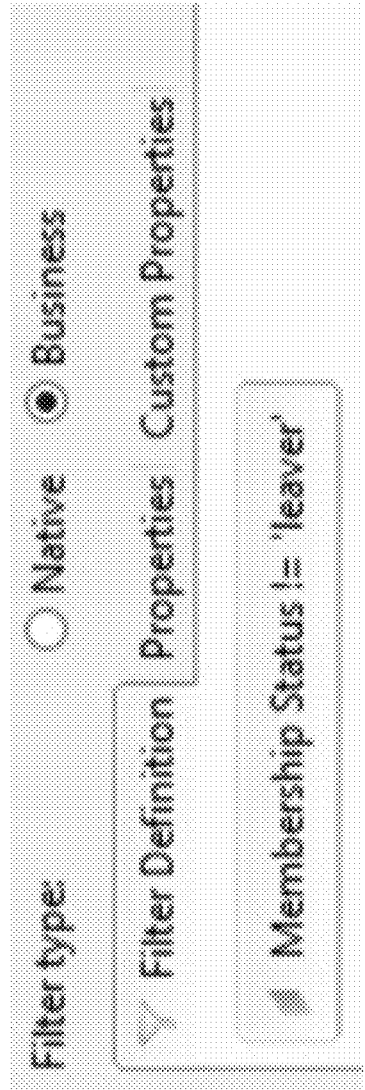
FIG. 36 is an example embodiment of filter applied to a subject folder.
FIG. 37 is an example embodiment of a user interface.

In some instances, a filter may be a "mandatory" filter, where mandatory filters are always applied to any query depending on their configuration. In some embodiments herein, mandatory filters are defined to ensure all objects within a given subject folder are filtered to only show results constrained to this specific subject. Accordingly, the mandatory filter is applied to the subject folder. This aspect is illustrated in FIG. 36 where the highlighted filter at 3605 includes a folder representation 3610 as part of filter icon 3615. The following types of statements may be used to define a mandatory filter for a particular folder, in some embodiments.

```
filter.setCompulsory(true);
filter.setFilterScope (FilterScope.FOLDER);
```

In some embodiments, other types of filters, referred to herein as business filters, may be implemented to generate a specific use-case and/or complex filters. These filters may also be defined by a using a query panel 3700, as shown in FIG. 37. FIG. 37 is similar to FIG. 35, except the "Business" filter type button 3705 is selected in FIG. 37. Business filters may be expressed, at least in part, as a query. Accordingly, complex filters may be generated. For example, a business filter may specify more than merely constraining a result to an entire subject. FIG. 38 is an example of sample code including a filter definition based on a query, as seen at 3805.

Figure 39:
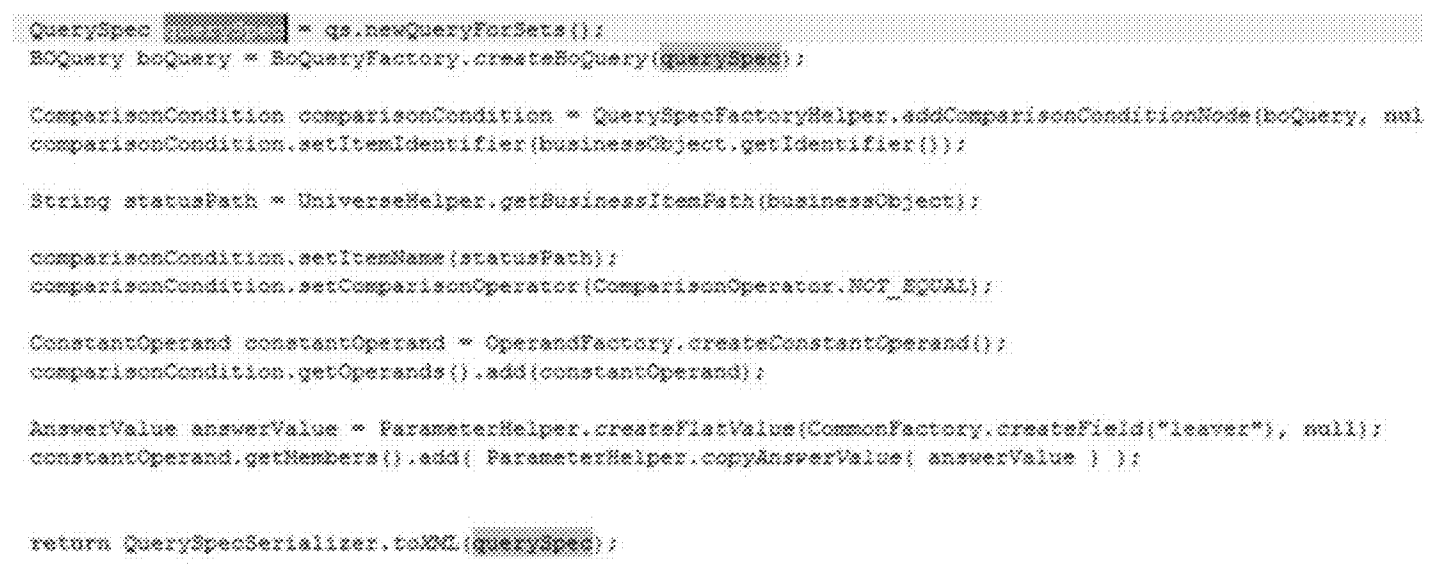

In some embodiments, a business filter might rely on an XML representation of the Query Panel selection to be provided, which is referred to herein as a Query Specification (QS). In some instances, a QS might be constructed manually using a string or an API might be used (e.g., a "Query Technique" API) to build a query and then convert it into XML, as illustrated by the sample code of FIG. 39.

In some aspects, the robustness and power of a customer's BL might be more fully realized by creating more complex objects (e.g., BOs) than simple BOs. The complex objects may provide and/or facilitate greater flexibility and value to a customer—as well as their users.

In some aspects, complex objects might be created to further allow the creation of analytics for Sets. However, in accordance with some aspects herein the generation of the BL might be tailored for this and/or other objective(s).

In some aspects, the power of complex BO's is provided in their SQL expression. For simple objects, we may completely auto-generate the expression, but in the case of complex expressions the corresponding SQL may need to be predefined based on the desired objective(s).

In some aspects, a BO created with a complex expression may be tailored to the database (DB) platform the customer runs on. However, due to the fact Sets may support multiple databases (e.g., Oracle, MS SQL Server, IBM Teradata, etc.) and each database uses varying syntax (e.g., for example date expressions), then the auto-generation of such objects may also need to account for all supported platforms. Accordingly, auto-generation functions may be made aware of which DB the BL is being generated for. Knowledge of the particular DB may be known or determined based on the connection attached to the Universe and as encapsulated in a class (e.g., Java) that abstracts the specific DB and substitutes the correct syntax when needed.

In some embodiments, a SQL expression should be as generic as possible to support as many DB platforms as possible. An example of such an expression can be seen in the example sample code shown in FIG. 40.

Figures 40, 41:
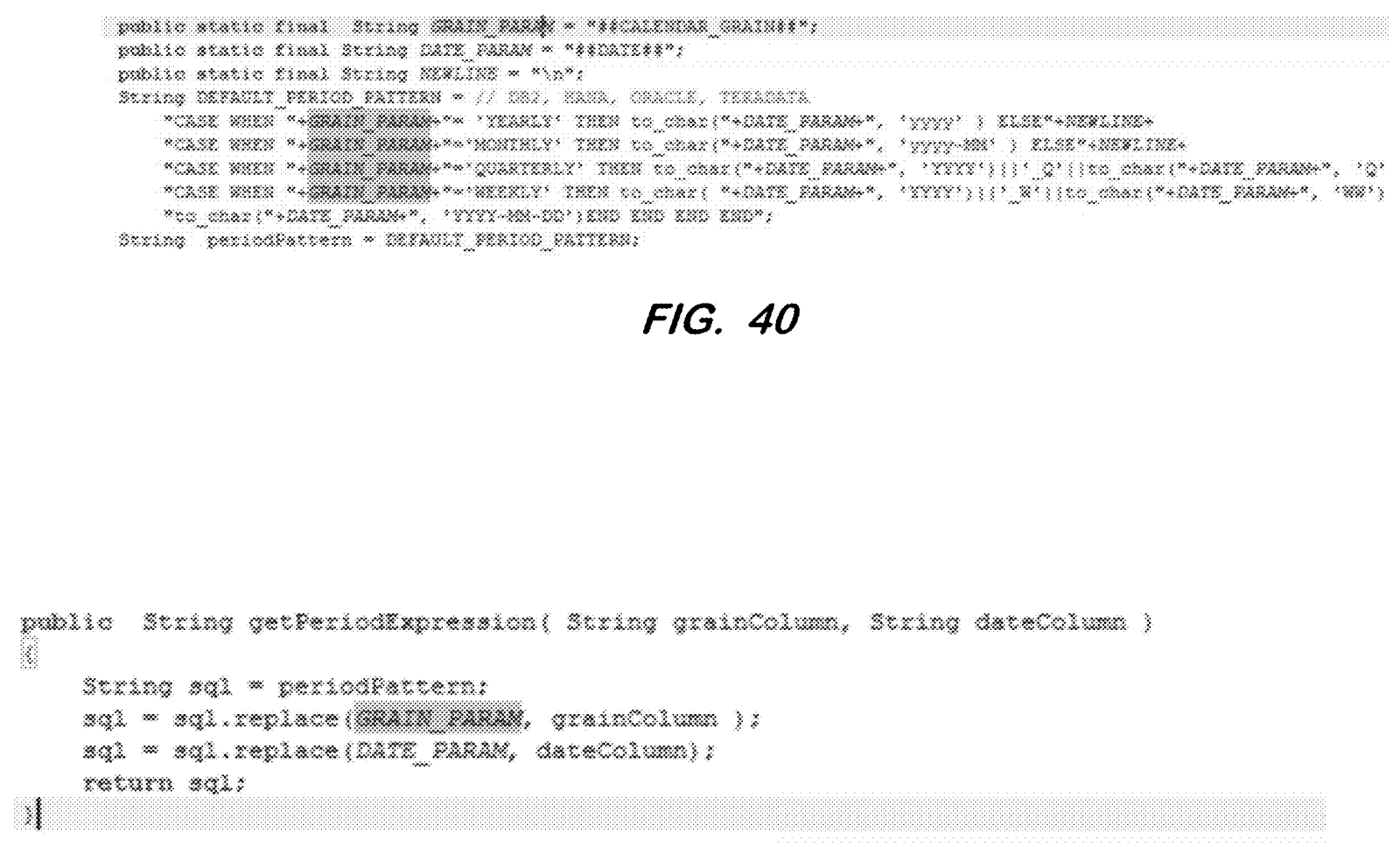

In some aspects, once the generic expression is defined for multiple DB platforms, a method may be used to substitute the DB syntax specifics at runtime. An example of such a method is shown in FIG. 41.

Figure 42:
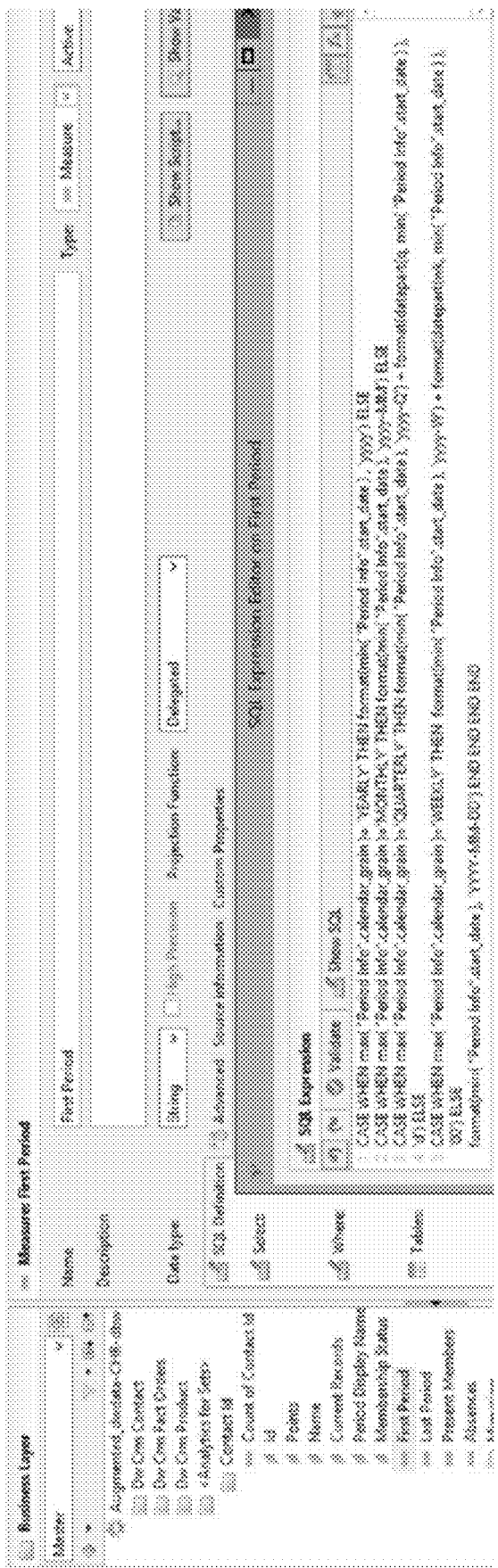
FIG. 42 is an example embodiment of a user interface.

FIG. 42 shows a user interface 4200 including a final, generated object where the specific generation is provided for MS SQL Server. In this manner, the present disclosure provides a mechanism for generating generic yet tailored BOs.

In some aspects, the novel and innovation aspects of auto-generating the BL herein for Sets is advantageous on a technical level. In an effort to address some usability and customer-friendly aspects, additional aspects may be considered. Such considerations might include, for example, allowing a customer to view what was generated before enabling it for end users; controlling which generated objects are displayed to end users; and customizing generated objects (if needed), where the customization might include, for example, renaming objects, SQL optimizations or refinements, testing object results in a local QP, and other functional improvements.

Figure 43:
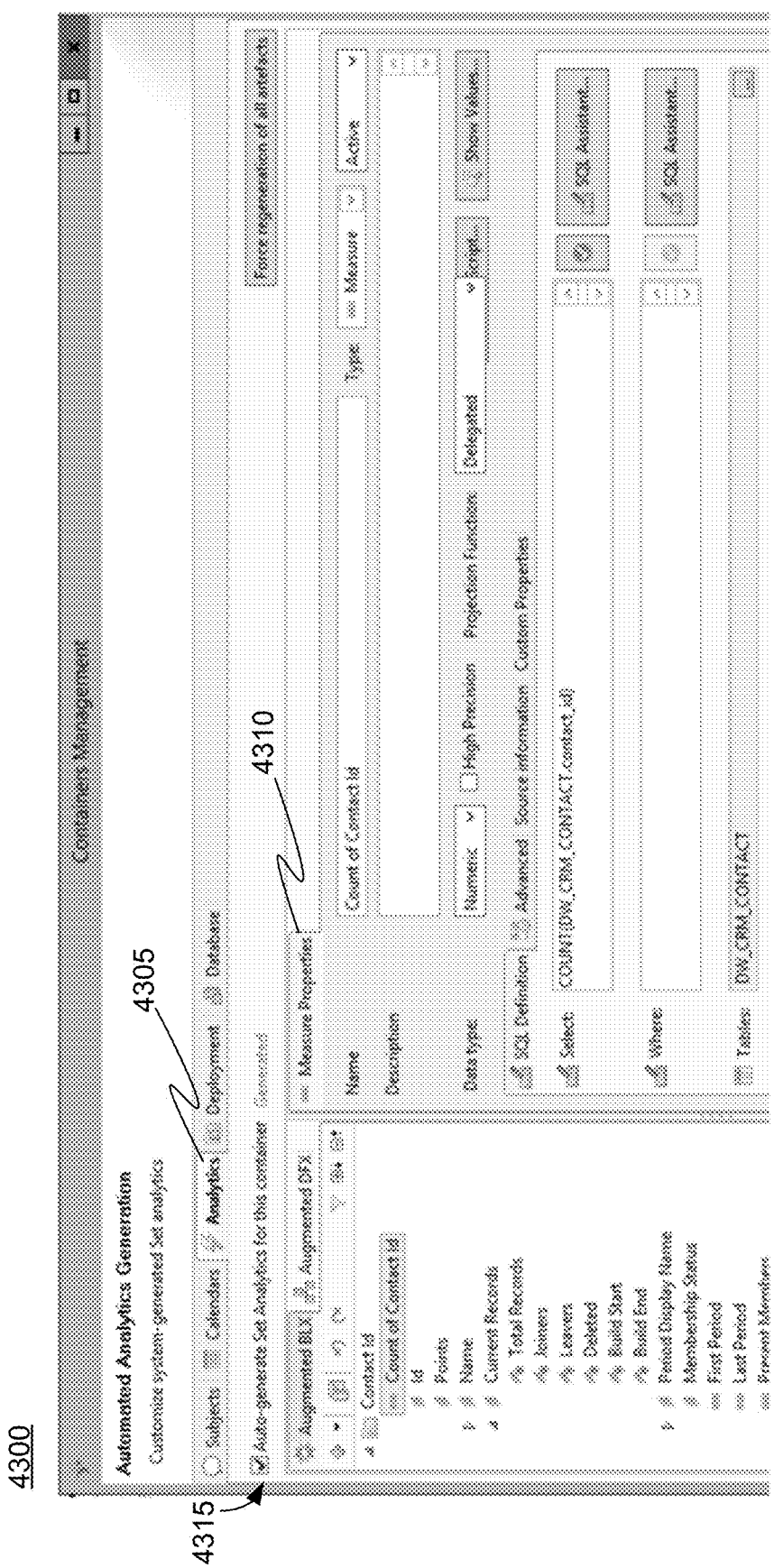
FIG. 43 is an example embodiment of a user interface.

In some embodiments, the generated objects for the DF and BL may be stored as fragments in the Set container. Such storage supports the provisioning of user customizations such as those listed above. For example, a user interface including a Sets control panel (e.g., 'Containers Management') may be used without compromising the customer's published universe. FIG. 43 is an illustrative depiction of such a user interface 4300. UI 4300 may be used to customized augmentation exposure. In some aspects, UI 4300 provides a template of everything that might be produced based on additions to the DF. However, an administrator (or other authorized entity) might not want or desire to have all features implemented/exposed to all users.

From the Analytics tab 4305, the subject folders and all objects generated underneath them are shown. A user may also select a specific generated object to view/modify its SQL expression, rename it if needed, change its security policy, its visibility, and other refinements by modifying its properties at 4310. In this manner, BOs generated based on the DF additions herein may be configured in a robust and expansive manner.

In one aspect, the auto-generation of Sets Analytics herein may be selected or de-selected at 4315. If de-selected (i.e., turned off) then the subject universe will perform as usual without any augmented universe features/aspects.

In some aspects, the customization of BOs constructed based on DF additions is possible because an in-memory copy of the customer's universe are operated on and the DF fragments are merged into it to create a transient universe. The transient universe is used to display BOs consistent with the customer's DB. The process of merging the generated DF fragments into the original universe is referred to herein as 'Augmentation Playback' and is discussed in greater detail hereinbelow.

Figure 44:
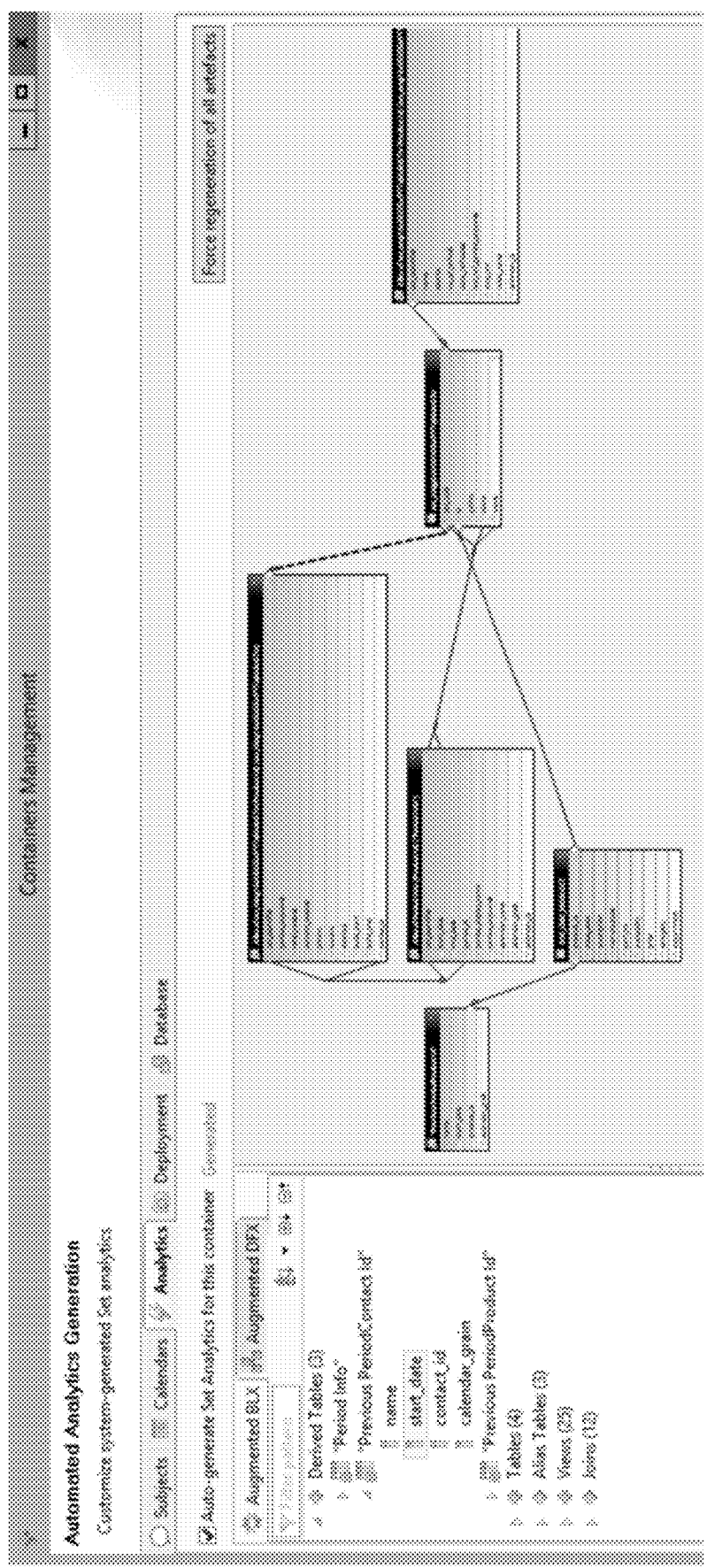
FIG. 44 is an example embodiment of a user interface including a display of an augmented Data Foundation.

In some embodiments, in addition to viewing the BL, a user may also view the augmented DF and all of its generated objects as illustrated in the UI shown in FIG. 44.

To achieve a reconstruction of a universe on every QP request (or other product application tool at runtime), the present disclosure includes a sophisticated mechanism that may include a number of constraints. In particular embodiments, this mechanism stores both data foundation (DF) and business layer (BL) generated objects outside of the published universe (e.g., so as not to perturb the published universe); it is able to surgically inject each auto-generated object into the correct location without disrupting the integrity of the universe; it is able to restore the universe to its initial state upon the completion of a QP (or other product application tool) since, for example, the universe will eventually be cached and could be used for other purposes that do not use the augmented sets-related data; and it should be sufficiently fast and efficient so that its impact on QP load times are minimal. This Augmentation Playback mechanism will now be described in detail below.

Augmentation Playback may be invoked in response to a query of a semantic layer universe involving at least one sets-related DF and BL auto-generated objects, in accordance with the present disclosure. As a prerequisite to an Augmentation Playback process herein, there is a generation and registration of DF and BL objects. When augmentation is being performed for a first time (i.e., nothing is stored), an initial generation is initiated. During this generation phase, every automatically created object is catalogued in a list of model fragments. These fragments may act as a reference as to how to build the final augmentation. FIG. 45 includes sample code for a generation phase in some embodiments. In FIG. 45 at 4505, a list is used to record all created objects that are related to the DF. At 4510 of FIG. 45, all auto-generated BL objects are stored under a root folder.

Figures 46, 47:
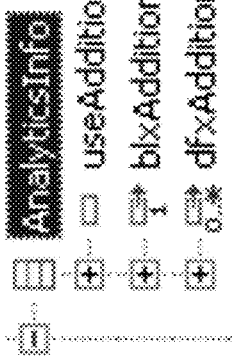
FIG. 46 is an example depiction of a persistence model.
FIG. 47 is an example embodiment of sample code for storing DF and BL objects.

In some aspects, the above-described lists are to be persisted into an underlying model so they may be saved offline and restored in memory, as often as required. FIG. 46 is an illustrative depiction of a persistence model, designed in accordance with some embodiments herein to store the list of DL object additions and BL list folder additions.

The code sample depicted in FIG. 47 demonstrates, in some aspects, how registered DF and BL objects can be stored in the persistence model as a reference point for future injections. As illustrated, the BL object additions as included in the folders referenced at 4705 are specified as being stored as defined at 4710 and the DF object additions as included in the generated folders referenced at 4715 are specified as being stored as defined at 4720.

In some aspects, in order to perform an augmentation 'playback' herein, every reference stored in the persistence model is read from its storage location and injected into memory, rather than being generated repeatedly again and again when called upon/requested. In some aspects, this feature enables a fast and efficient operation that does not adversely impact QP load times.

The injection process for an augmentation playback is very complex, particularly with regards to the DF since it involves reattaching persisted model fragments to a complete 'live' model in a specific order. Herein, the injection of the persistence model to the in-memory universe may be automated at the code level. As such, any discrepancies in attaching or reattaching objects in the primary universe may result in errors that might be propagated through the universe. Accordingly, it is important that all generated objects be properly attached to the universe.

Figure 48:
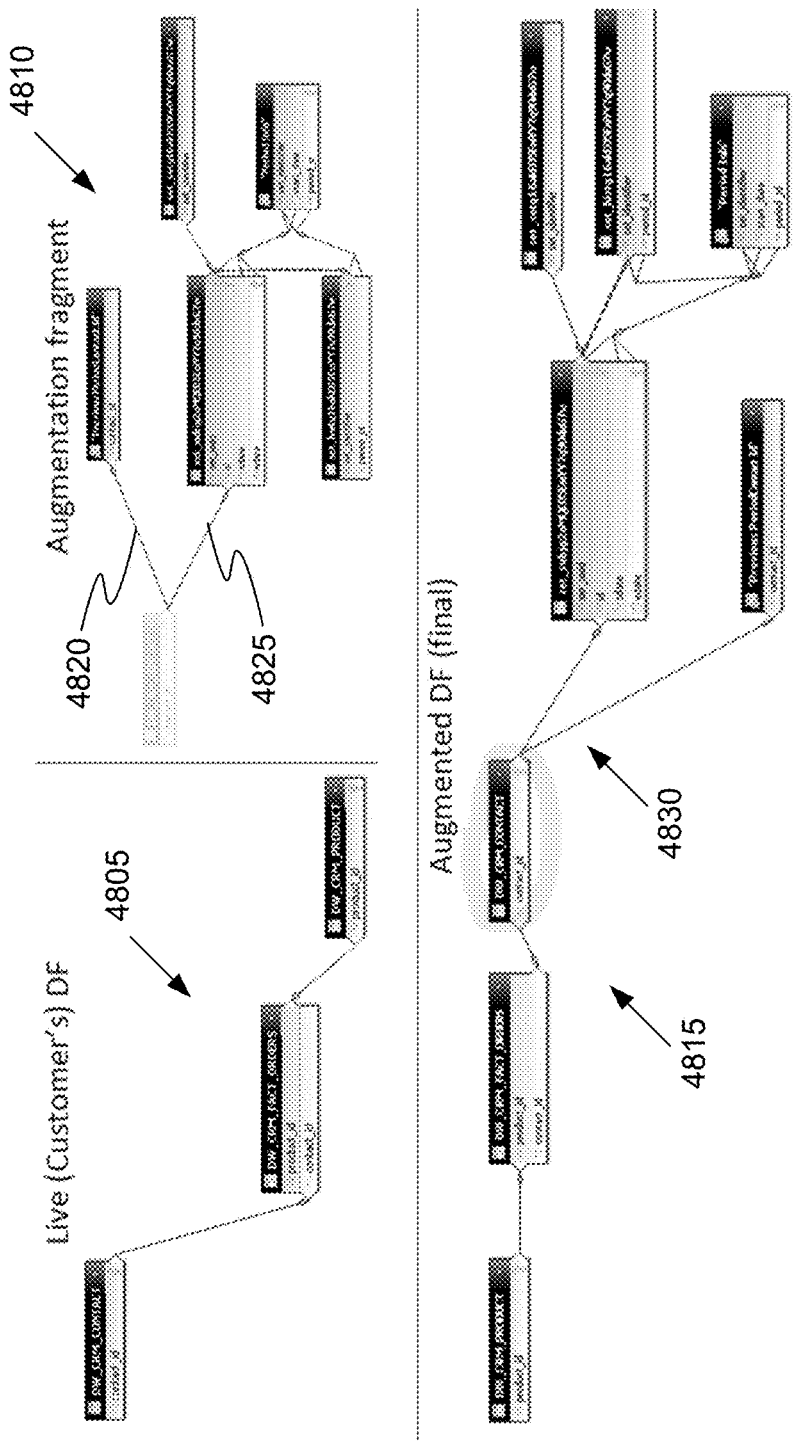
FIG. 48 is an illustrative depiction of an augmented DF.

FIG. 48 includes an illustrative depiction of a customer's (live) DF at 4805 and an augmentation fragment at 4810, as well as the DF reattached to the live DF at 4815. It is noted that in some embodiments, the augmentation fragment 4810 must include all joins (e.g., 4820, 4825) specifying the relationship to the Customer's schema, where they are only attached during the injection process, as shown at 4830.

To achieve the desired aspect of injecting each generated object into a live DF, each object, depending on its nature, is retrieved from its storage fragment, before being reattached to the 'live' DF in a very specific order to ensure all aspects of the customer's universe remain fully functional. That is, the nature of each type of object being 'injected' into the live DF is considered in order to ensure that the customer's universe operates correctly after the injection process. Accordingly, there is a specific injecting process per each different type of object being injected into the DF of the universe.

In some aspects, a sorting process may be performed to ensure the DF objects are injected to the DF in a proper order so that, for example, the functionality of the universe is fully maintained. In some aspects, the DF objects are injected before the BL objects since the BL depends on the DF. Likewise, columns and tables are injected before joins since joins necessarily depend on tables and joins. As shown in FIG. 49, a weight is assigned to each object type and may be used to achieve these stated goals.

In some aspects, a sorting process herein may be implemented by the use of a coded processing algorithm. A sorting process herein may take into consideration design or model aspects of a universe. For example, a universe comprises columns, tables, joins, and views in a hierarchical configuration. In some embodiments, a sorting process herein may be supported by assigning different weights to different objects types. A weight is assigned to each object type, with the lowest weight being the most dependent. That is, the object type with the lowest weight is the last to be achieved and the object type with the highest weight is the first to be achieved. The sorting algorithm depicted in FIG. 49 specifies a Join is assigned a weight of 5, a TableView is assigned a weight of 10, a Family is assigned a weight of 11, a DataFoundationView is assigned a weight of 12, an AliasTable is assigned a weight of 15, a SQLTable (i.e., actual physical table) is assigned a weight of 25, and a DerivedTable is assigned a weight of 29. The sorting process of FIG.

49 enumerates each type (i.e., class) of object and pre-orders them so that when an object is needed, its dependencies have already been processed. The assigned weights may reflect the technical constraints of a universe model. For example, a SQL table (w=25) has a higher weight than an alias table (w=15) that is built based on the physical SQL table. Once the tables are established, a family may be built (w=11), then a table view (w=10), and finally joins (w=5) that link table views.

An underlying model may impose specific constraints, such as, for example, "an object can only belong to one model". Thus, if we want to remap reference points from their fragment to the 'live' DF, then we use copies of objects. Otherwise, original elements will be moved, thereby corrupting our references for future injections. The following sample code may be used to create copies in some embodiments.

```
For(EObject 0:info.getDfxAddittionsDescriptors( )) {
    dfxAdditions.add(copy = RcoreUtil.copy(o));//Work on copy because of EMF
containment
    mapOriginal2Copy.put(o, copy);
}
Sort(dfxAdditions, true);
```

Once the copies are generated, the sorted copies may be attached to the live DF. However, simply attaching copies to the live DF might not be sufficient in some cases, and for these cases we ensure that all objects are added (e.g., one by one) consistent with each other, as well as with the target DF. Accordingly, in many instances a sequence of operations is relied upon, with the sequence of operations including (1) attaching and (2) remapping, if need be. The specific aspects for a sequence of operations may vary depending on the type of object being injected into the DF. The present disclosure includes illustrative operations for attaching and remapping (if any) of different types of objects.

For tables, it is noted that all table types follow a basic attaching procedure. Then, depending on their subtype, additional computations may be performed for remapping them to the 'live' DF environment. The basic attaching procedure may be performed in accordance with the following:

```
if(o instanceof Table) {
    jafo.getTables( ).add((Table)o);
```

For Derived tables (i.e., dynamic constructs based on SQL (actual) tables), the attaching may be the same as other tables, as seen above. For remapping of derived tables, a most important aspect is their SQL expression, from which the table definition (e.g. column instances) is deduced. The SQL expression of the table is to be bound to the DF in some manner not sure this is relevant right here as we are talking about DF related objects. The expression must be re-encoded to match the live DF and the data source remapped, as demonstrated below:

```
else if(o instanceof DerivedTable) {
    DerivedTable d = (DerivedTable)o;
    d.setDataSource (dafo.getDataSource( ));
    SQLParserResult result = EncodeDecodeHelper.encodeExpression(dafo,
```

```
d.getExpression( ),solver);
    if(result !=null)
        d.setEncodedExpression(result.getEncodedExpression( ));
}
```

Here, re-encoding is needed since, although the string expression uses the same column names in both worlds I.e., customer's live DF and the in-memory instance), the in-memory instances of such columns are different.

For SQL tables (i.e., standard tables coming from the DB's catalogue), the attaching may be accomplished the same as other tables, as generally disclosed above. For remapping, only the SQL Table's data source needs to be remapped, as shown by the example below:

```
if(o instanceof SQLTable) {
    SQLTable sqlTable = (SQLTable)o;
    sqlTable.setDataSource(dafo.getDataSource( ));
}
```

Regarding alias tables (i.e., mirror images mimicking an original table; used to break loops), attaching may be accomplished like all tables, disclosed above. There may be an additional operation to consider however since, by their nature, aliases must "listen" to their original table in order to reflect all changes performed on the original table. Accordingly, the following code may be used for alias tables:

```
if (o instanceof AliasTable)
    AliasHelper.registerAliasTable((AliasTable)o);
```

Regarding remapping of alias tables, since the original table of an alias table has been transported from one environment to the other via a copy, the alias needs to re-point to the copy of the original. It is noted that an alias table does not have a data source of its own, it instead uses the original table's data source. Remapping of alias tables may be accomplished by the following example code:

```
else if(o instanceof AliasTable) {
    AliasTable at = (AliasTable)o;
    Table originalTable = at.getAliasTable( );
    Table copiedTable = (Table)mapOriginal2Copy.get(originalTable);
    At.setAliasTable(copiedTable);
}
```

For Data Foundation views (i.e., groupings of TableViews), several data foundation views may be created for the end-user to help their understanding of what was auto-generated by logically grouping associated DF elements together. One view is created per subject, plus one view that contains the Customer schema before injection (i.e., the fully augmented DF will be found in the Master view that stores all tables).

For the attaching operation, the following code sample demonstrates how data foundation views are dispatched in two separate buckets, based on their name and then added to the DF. In particular:

```
else if(o instanceof DataFoundationView) {
    DataFoundationView dfxView = (DataFoundationView)o;
    if (AUTOGENERATED_VIEW_ORIGINAL_NAME.equals
        (dfxView.getBusinessName( ))){
        originalView = dfxView;
    }else {
        subjectViews.add(dfxView);
    }
    Dafo.getDataFoundationViews( ).add(dfxView);
    dfxView.betTableViews( ).clear( );//Get rid of obsolete references;remapping below will do
        the job!
}
```

In some embodiments, a remapping for DF views is not needed.

For the object type Families (i.e., a UI concept used to alter the display of TableViews (e.g., text color, font, size, background, etc.)), an attaching procedure is straightforward and is applied to the sole family auto-generated in the following manner:

```
else if (o instanceof Family) {
    dafo.getFamilies( ).add((Family)o);
}
```

Regarding a remapping, only one autogenerated family is created. Accordingly, we only collect it for future use by Table Views (see next sub-section).

```
else if (o instanceof Family) {
    Family fm = (Family)o;
    family = fm;
}
```

For TableViews (i.e., UI embodiments of Tables including positioning on-screen, families), TableViews (TV) may be particularly difficult to attach and remap since each TV belongs to one Data Foundation View (DFV). Accordingly, care may be taken to ensure that each TV is correctly attached to the correct DFV. The standard TV model does not really support extra pieces of information that might help with a remapping procedure. Therefore, pairing information may be stored by tagging the description of the TV with an ownership data during the generation process. This additional information may then be retrieved as a TableViewInfo. In some embodiments, there may be five potential locations a TV can belong to, including:

CUSTOMER_IN_DEDICATED: This TV relates to a Customer's subject table, in its dedicated DFV
GENERATED_IN_DEDICATED: A fully-generated TV, in its dedicated DFV
CUSTOMER_IN_MASTER: A Customer's subject TV, in the Master view
GENERATED_IN_MASTER: A fully-generated TV, in the Master view
CUSTOMER_IN_ORIGINAL: A Customer TV in the pre-injection DFV The code sample included in FIG. 50 relates to TableViews and the tagging thereof for attaching and remapping purposes. As seen, the tagging information corresponds to the five different ownership types introduced above. In some aspects, different tags would correspond to a different coding.

Once we know where to look based on the associated tags, attaching TVs may be a matter of finding the right DFV based on what the TV's description (filled at generation-time) specifies, as the code sample in FIG. 51 demonstrates.

Regarding a remapping of TVs, the TableViewInfo introduced above also contains the identifier of the SQL Table of which the TV is the UI reflection. In some aspects, care is taken to make sure Customer related TV are not remapped since they already map to the correct SQL Table from the original DF created by the client. This aspect is addressed by the sample code listing in FIG. 52.

For the object type of Joins (i.e., SQL relationships between two tables, through their columns), the attaching procedure is straightforward, common to all joins, and can be accomplished by the following:

```
else if(o instanceof Join) {
    dafo.getJoins( ).add((Join)o);
}
```

For remapping of Joins, a most important aspect is the SQL expression from which involved column instances are deduced. The expression is re-encoded to match the live DF because although the string expression uses the same column names in both worlds, the in-memory instances of such columns are different. As such, the sample code below may be used:

```
else if(o instanceof SQLJoin && solver != null) {
    SQLJoin j = (SQLJoin)o;
    JoinHelper.setJoinExpressionEx(dafo, j, j.getExpression( ), solver);
}
```

In some aspects regarding a Business Layer Injection, the generated Business Layer objects are added on top of the generated DF. In some aspects, a BL injection herein is simpler than the DF injection process that is specific per object type. For the BL injection, the folder including the BL fragments or additions and all its contents, including sub-folders and Business Objects (BO) contained therein are copied, as demonstrated in the sample code below:

```
Folder blxAdditions = null;
if(info.getBlxAdditionsDescriptor( ) != null) {
    blxadditions = Folder(EcoreUtil.copy(info.getBlxAdditionsDescriptor( ))'//Work
on copy
     because of EMF containment
     List<BusinessItem> items = UniverseHelper.getBusinessItems(blxAdditions, BusinessItem.class);
```

For remapping, each generated BO has an associated expression (i.e., binding). When attaching these back to the Universe, the BO needs have their expressions re-encoded according to the universe/DFX they are being attached to. This re-encoding process can be seen below:

```
List<BusinessItem> items = UniverseHelper.getBusinessItems(blxAdditions, BusinessItem.class);
for(BusinessItem item : items) {
    BindingHelper.reEncodeBinding(universe, item, solver);
}
```

The attaching procedure is straightforward and includes attaching the folder to the Universe root folder, as demonstrated bellow:

Universe.getRootFolder(   ).getBusinessItems(   ).add (blxAdditions);

In some aspects, it may be important to remove any augmentation and restore the universe back to its original state upon completion of a QP (or other) process using an augmented universe herein. This may be done so that, for example, other processes that require use of the universe without the sets-related augmentation data are not adversely affected by the augmentation. The process for restoring a universe back to its pre-augmentation original state is referred to herein as "clean-up".

In some aspects, augmentations may be cleaned-up because a next process might not need the augmentation. In this manner, a system and method herein may avoid changing a universe and impacting a process that uses the universe but does not need to augmentations. In some aspects herein, when a process requests augmentation based on sets-related tables, a mapping is done based on the configuration of the universe. The augmentation playback runs to add all of the generated fragments to the universe. A user may complete an operation (i.e. QP query) and when the operation is complete, a rollback or clean-up process may be invoked to restore the universe to its original state prior to the augmentation. The universe may still be cached but it is restored to its original state that it was initially before the augmentation, without sets augmentation.

For Universe Clean-up (i.e., removing the augmented folder from the universe root), the augmented Universe is reviewed to identify the augmented folder by a property that that was assigned to this folder during augmentation generation. Namely, the root folder added during the augmentation process to contain all of the auto-generated fragments is searched for and identified. The following sample code may be used for this purpose.

```
try {
    Value =
f.getPropertyBag( ).getPropertyValue(STES_DYNAMIC_FOLDER_PROP);
}
```

Once this folder is identified, it can be removed from the Universe as shown below.

```
if(addedFolder ! = null)
    addedFolder.getParentFolder( ).getBusinessItems( ).remove(addedFolder);
```

For DFX (DataFoundation) Clean-up (i.e., removing the augmented folder from the universe root), we first need to collect all generated objects from the DFX and add them to a list. Here too, we can identify each object by tags applied to the objects during the generation process.

For DFX Views, generated DFX views are retrieved and then added to the list. This may be accomplished by the sample code below.

```
public static boolean isAutoGenerated (AbstractDataFoundationView view) {
    if (view.getDescription( ) != null && (view.getDescription( ).contains(SUBJECT_VIEW_TAG)
        ||view.getDescription( ).contains(ORIGINAL_VIEW_TAG)){
        return true;
```

```
        }
        return false;
    }
    createdDFXElements.add(dfView);
```

From each DFX view, the corresponding generated tables need to be retrieved and collected. The specific procedure may vary for the different types of tables. For example, for SQL Tables, the retrieval and collection might be performed by the following sample code.

```
if(t instanceof SQLTable) {
    SQLTable st = (SQLTable)t;
    //Only remove SWLTables as know were created ourselves, and keep Customer SQLTables
    if(SETS_AUTOGENERATED_TABLE_TYPE.equals(st.getType( ))) {
        createdDFXElements.add(st);
        considerJoin = true
    }
}
```

For Alias Tables, the retrieval and collection might be performed by the following sample code.

```
else fi (t instanceof AliasTable) {
    AliasTable at = (AliasTable)t;
    if (at.getAliasedTable( ) instanceof DeriveTable) {
        DerivedTable derivedTable = (DeriveTable)at.getAliasedTable( );
        if(SETS_AUTOGENERATED_TABLE_TYPE.equals
        (derivedTable.getDescription( ))) {
            createDFXElements.add(at);
            considerJoin = true;
        }
    //We know for sure that all AliasTables present in this dedicated Sets view were
    created
    by or
    }else if(SETS_AUTOGENERATED_TABLE_TYPE.equals
    (((SQLTable.getAliaseTable( )).getType( ))) {
        createdDFXElements.add(at);
        considerJoin = true;
    }
}
```

For Derived Tables, the retrieval and collection might be performed by the following sample code.

```
else if(t instanceof DerivedTable) {
    DerivedTable derivedTable = (DerivedTable)t;
    if(SETS_AUTOGENERATED_TABLE_TYPE.equals(derivedTable.get Description( ))) {
        createdDFXElements.add(derivedTable);
        conseiderJoin = true;
    }
}
```

Regarding DFX clean-up of joins, as the generated tables are collected (e.g., as disclosed above), all of the joins attached to these same generated tables may be collected. Code encapsulating this feature might be implemented by, for example, the sample code depicted in FIG. 53.

After collecting a list of generated objects, they may be removed from the DFX, for example, as shown in the code in FIG. 54, where each type must be removed in a specific way.

In some aspects, a general life-cycle of the generated objects may be considered. As disclosed herein, objects are generated based on Set Subjects. Accordingly, we may consider whether subject tables are renamed, new subjects are added, subjects are removed, whether the general metadata tables are renamed, or otherwise changed. Since these types of changes impact saved fragments related to changed subjects, the saved fragments need to be updated to reflect the changed subjects. The updating of saved fragments may entail the adding and/or deleting of tables and joins, the renaming of tables, etc. incrementally as necessitated by the changes.

For example, if a customer adds a new subject to their universe then a previous list of stored fragments will not include the new subject. Therefore, an incremental regeneration of objects for the newly added subject may be invoked to add updated objects to the existing fragments so that when a 'playback' is later executed, it runs with the latest version of subjects.

In some aspects for changes to a subject, the subject related objects may be incrementally regenerated by (1) identifying the "out of date" (i.e., changed) subjects; (2) ensuring their ID's are recorded so newly generated object(s) can maintain these ID's, where this is to ensure any reports based on these objects are still functional; and (3) only generate new objects for this subject and use the recorded ID's to remap these new objects. For new subjects we only generate new objects and add them to the live DFX and universe.

Figure 55:
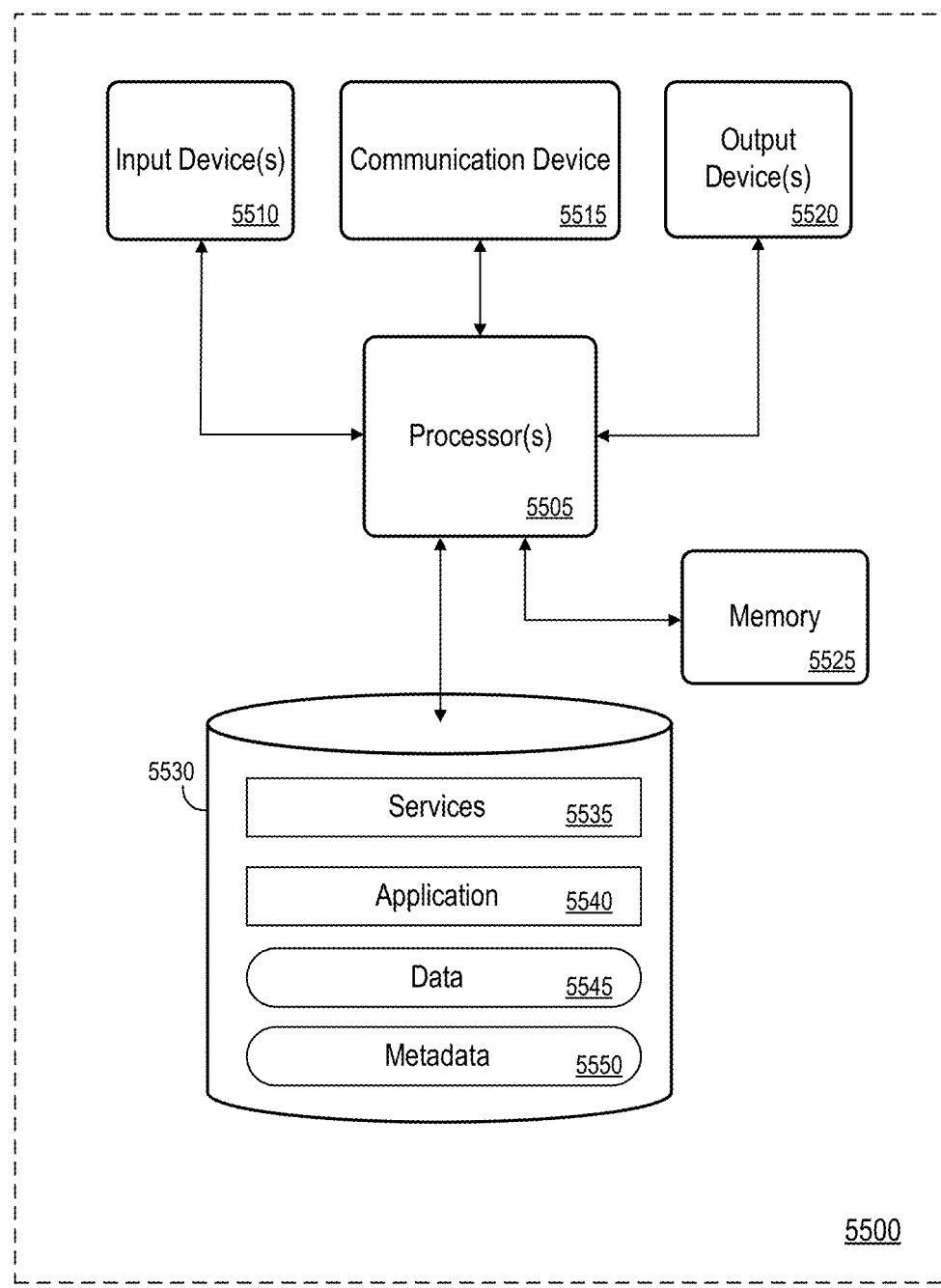
FIG. 55 is a block diagram of an apparatus, according to some embodiments.

FIG. 55 is a block diagram of apparatus 5500 according to some embodiments. Apparatus 5500 may comprise a computing apparatus and may execute program code to perform any of the functions described herein. Apparatus 5500 may comprise an implementation of server supporting an application (e.g., 210), a semantic layer 225, and a data store of FIG. 2 in some embodiments. Apparatus 5500 may include other unshown elements according to some embodiments.

Apparatus 5500 includes processor 5505 operatively coupled to communication device 5520, data storage device 5530, one or more input devices 5510, one or more output devices 5520 and memory 5525. Communication device 5515 may facilitate communication with external devices, such as a reporting client, or a data storage device. Input device(s) 5510 may comprise, for example, a keyboard, a keypad, a mouse or other pointing device, a microphone, knob or a switch, an infra-red (IR) port, a docking station, and/or a touch screen. Input device(s) 5510 may be used, for example, to enter information into apparatus 5500. Output device(s) 5520 may comprise, for example, a display (e.g., a display screen) a speaker, and/or a printer.

Data storage device 5530 may comprise any appropriate persistent storage device, including combinations of magnetic storage devices (e.g., magnetic tape, hard disk drives and flash memory), optical storage devices, Read Only Memory (ROM) devices, etc., while memory 5525 may comprise Random Access Memory (RAM), Storage Class Memory (SCM) or any other fast-access memory.

Services 5535 and application 5540 may comprise program code executed by processor 5505 to cause apparatus 5500 to perform any one or more of the processes (e.g., process 2400) described herein. Embodiments are not limited to execution of these processes by a single apparatus.

Data 5545 and metadata 5550 (either cached or a full database) may be stored in volatile memory such as memory 5525. Metadata 5550 may include information regarding fields, attributes, and methods of objects comprising a semantic layer. Data storage device 5530 may also store data and other program code and instructions for providing additional functionality and/or which are necessary for operation of apparatus 5500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable instructions; and
a processor to execute the processor-executable instructions to cause the system to:
receive a request to perform an operation relying on sets-related tables of a semantic layer universe;
inject, in response to the received request, persisted Data Foundation (DF) objects stored in a dedicated data structure of a first set container into an in-memory representation of a semantic layer universe, each of the DF objects being automatically created based on sets-related tables of the semantic layer universe, wherein the injecting of the DF objects into the in-memory representation of the semantic layer universe comprises:
sorting all of the DF objects in a ranked order, where each DF object is one of a plurality of object types and each object type is assigned a relative rank; and
injecting the DF objects into the in-memory representation of the semantic layer universe in an ordered sequence based on the rank assigned to each object type;
inject, in response to the received request, persisted business layer (BL) objects stored in a dedicated data structure of the first set container into the in-memory representation of the semantic layer universe, each of the BL objects being automatically created based on the sets-related tables of the semantic layer universe; and
execute the operation on the augmented semantic universe, including using the injected DF objects and the injected BL objects.

2. The system of claim 1, further comprising the processor to execute the processor-executable instructions to cause the system to:
use an in-memory catalog listing of the BL objects and DF objects automatically created based on sets-related tables for the semantic layer universe; and
reconstruct the in-memory catalog listing from a data structure corresponding to the augmented semantic layer universe fragments persisted in the first set container.

3. The system of claim 2, wherein the injecting of the DF objects and the BL objects comprises reading the DF objects and the BL objects, respectively, from the catalog listing reconstructed in the in-memory data structure corresponding to the augmented semantic layer universe after reading it from a storage structure persisted in the first set container.

4. The system of claim 1, further comprising the processor to execute the processor-executable instructions to cause the system to:
   attach and remap each of the DF objects to the in-memory representation of the semantic layer universe, wherein a procedure for the attaching and a procedure for the remapping of each of the DF objects depends on the object type of each DF object.

5. The system of claim 1, wherein the injecting of the BL objects into the in-memory representation of the semantic layer universe comprises:
   copying a folder containing the BL objects, the folder including subfolders and Business Objects (BOs);
   remapping the BOs in the copied folder to correspond to a DF of the in-memory representation of the semantic layer universe; and
   attaching the copied folder to a root folder of the in-memory representation of the semantic layer universe.

6. The system of claim 1, further comprising the processor to execute the processor-executable instructions to cause the system to:
   identify a root folder of the in-memory representation of the semantic layer that contains a listing of the BL objects corresponding to the sets-related tables of the semantic layer universe;
   remove the identified root folder from the in-memory representation of the augmented semantic layer;
   identify all DF objects of the in-memory representation of the augmented semantic layer corresponding to the sets-related tables of the semantic layer universe, wherein a procedure for the identifying of the DF objects depends on a DF object type of each DF object; and
   remove the identified DF objects from a data foundation of the in-memory representation of the augmented semantic layer.

7. A computer-implemented method for authoring extensions to a semantic layer universe, the method comprising:
   receiving, by a processor, a request to perform an operation relying on sets-related tables of a semantic layer universe;
   injecting, by the processor and in response to the received request, persisted Data Foundation (DF) objects stored in a dedicated data structure of a first set container into an in-memory representation of a semantic layer universe, each of the DF objects being automatically created based on sets-related tables of the semantic layer universe, wherein the injecting of the DF objects into the in-memory representation of the semantic layer universe comprises:
      sorting all of the DF objects in a ranked order, where each DF object is one of a plurality of object types and each object type is assigned a relative rank; and
      injecting the DF objects into the in-memory representation of the semantic layer universe in an ordered sequence based on the rank assigned to each object type;
   injecting, by the processor and in response to the received request, persisted business layer (BL) objects stored in a dedicated data structure of the first set container into the in-memory representation of the semantic layer universe, each of the BL objects being automatically created based on the sets-related tables of the semantic layer universe; and
   executing, by the processor, the operation on the augmented semantic universe, including using the injected DF objects and the injected BL objects.

8. The method of claim 7, further comprising:
   using an in-memory catalog listing of the BL objects and DF objects automatically created based on sets-related tables for the semantic layer universe; and
   reconstructing the in-memory catalog listing from a data structure corresponding to the augmented semantic layer universe fragments persisted in the first set container.

9. The method of claim 8, wherein the injecting of the DF objects and the BL objects comprises reading the DF objects and the BL objects, respectively, from the catalog listing reconstructed in the in-memory data structure corresponding to the semantic layer universe after reading it from a storage structure persisted in the first set container.

10. The method of claim 7, further comprising attaching and remapping each of the DF objects to the in-memory representation of the semantic layer universe, wherein a procedure for the attaching and a procedure for the remapping of each of the DF objects depends on the object type of each DF object.

11. The method of claim 7, wherein the injecting of the BL objects into the in-memory representation of the semantic layer universe comprises:
   copying a folder containing the BL objects, the folder including subfolders and Business Objects (BOs);
   remapping the BOs in the copied folder to correspond to a DF of the in-memory representation of the semantic layer universe; and
   attaching the copied folder to a root folder of the in-memory representation of the semantic layer universe.

12. The method of claim 7, further comprising:
   identifying a root folder of the in-memory representation of the semantic layer that contains a listing of the BL objects corresponding to the sets-related tables of the semantic layer universe;
   removing the identified root folder from the in-memory representation of the augmented semantic layer;
   identifying all DF objects of the in-memory representation of the semantic layer corresponding to the sets-related tables of the semantic layer universe, wherein a procedure for the identifying of the DF objects depends on a DF object type of each DF object; and
   removing the identified DF objects from a data foundation of the in-memory representation of the augmented semantic layer.

13. A non-transitory computer readable medium having executable instructions stored therein, the medium comprising:
   instructions to receive a request to perform an operation relying on sets-related tables of a semantic layer universe;
   instructions to inject, in response to the received request, persisted Data Foundation (DF) objects stored in a dedicated data structure of a first set container into an in-memory representation of a semantic layer universe, each of the DF objects being automatically created based on sets-related tables of the semantic layer universe, wherein the injecting of the DF objects into the in-memory representation of the semantic layer universe comprises:
      sorting all of the DF objects in a ranked order, where each DF object is one of a plurality of object types and each object type is assigned a relative rank; and injecting the DF objects into the in-memory representation of the semantic layer universe in an ordered sequence based on the rank assigned to each object type;

instructions to inject, in response to the received request, persisted business layer (BL) objects stored in a dedicated data structure of the first set container into the in-memory representation of the semantic layer universe, each of the BL objects being automatically created based on the sets-related tables of the semantic layer universe; and instructions to execute the operation on the augmented semantic universe, including using the injected DF objects and the injected BL objects.

14. The medium of claim 13, further comprising:

instructions to use an in-memory catalog listing of the BL objects and DF objects automatically created based on sets-related tables for the semantic layer universe; and instructions to reconstruct the in-memory catalog listing from a data structure corresponding to the augmented semantic layer universe fragments persisted in the first set container.

15. The medium of claim 13, further comprising attaching and remapping each of the DF objects to the in-memory representation of the semantic layer universe, wherein a procedure for the attaching and a procedure for the remapping of each of the DF objects depends on the object type of each DF object.

16. The medium of claim 13, wherein the injecting of the BL objects into the in-memory representation of the semantic layer universe comprises:

copying a folder containing the BL objects, the folder including subfolders and Business Objects (BOs);

remapping the BOs in the copied folder to correspond to a DF of the in-memory representation of the semantic layer universe; and attaching the copied folder to a root folder of the in-memory representation of the semantic layer universe.

17. The medium of claim 13, further comprising:

instructions to identify a root folder of the in-memory representation of the semantic layer that contains a listing of the BL objects corresponding to the sets-related tables of the semantic layer universe;

instructions to remove the identified root folder from the in-memory representation of the augmented semantic layer;

instructions to identify all DF objects of the in-memory representation of the semantic layer corresponding to the sets-related tables of the semantic layer universe, wherein a procedure for the identifying of the DF objects depends on a DF object type of each DF object; and instructions to remove the identified DF objects from a data foundation of the in-memory representation of the augmented semantic layer.

* * * * *